United States Patent [19]
Matsumoto et al.

[11] Patent Number: 5,878,007
[45] Date of Patent: Mar. 2, 1999

[54] ANTI-WOBBLE OPTICAL MEDIUM AND TRACKING METHOD AND APPARATUS

[75] Inventors: Yasuki Matsumoto, Takarazuka; Mitsuro Moriya, Ikoma; Hiroyuki Yamaguchi, Hirakata; Shin-ichi Yamada, Katano, all of Japan

[73] Assignee: Matsushita Electric Industrial Co., Ltd., Osaka, Japan

[21] Appl. No.: 57,172

[22] Filed: Apr. 8, 1998

Related U.S. Application Data

[63] Continuation of Ser. No. 364,125, Dec. 27, 1994, abandoned.

[30] Foreign Application Priority Data

Dec. 27, 1993 [JP] Japan .................................. 5-333185
Feb. 14, 1994 [JP] Japan .................................. 6-17193

[51] Int. Cl.⁶ .................................................. G11B 7/095
[52] U.S. Cl. .................................. 369/44.34; 369/44.35; 369/47; 369/54; 369/275.3
[58] Field of Search ............................. 369/44.13, 44.34, 369/44.35, 47–48, 50, 54, 58, 111, 275.3–275.4

[56] References Cited

U.S. PATENT DOCUMENTS

| | | | |
|---|---|---|---|
| 4,707,816 | 11/1987 | Yonezawa et al. | 369/44.13 |
| 4,736,352 | 4/1988 | Satoh et al. | 369/275.3 X |
| 4,866,688 | 9/1989 | Ohtake et al. | 369/44.13 |
| 4,914,645 | 4/1990 | Getreuer et al. | 369/44.13 X |
| 5,459,710 | 10/1995 | Hoshino et al. | 369/275.3 |
| 5,481,531 | 1/1996 | Yamamuro | 369/275.3 |

FOREIGN PATENT DOCUMENTS

| | | |
|---|---|---|
| 57-50330 | 3/1982 | Japan . |
| 62-89241 | 4/1987 | Japan . |
| 62-183037 | 8/1987 | Japan . |
| 62-229534 | 10/1987 | Japan . |
| 63-34744 | 2/1988 | Japan . |
| 1-150246 | 6/1989 | Japan . |
| 3-173932 | 7/1991 | Japan . |

*Primary Examiner*—W. R. Young
*Attorney, Agent, or Firm*—Ratner & Prestia

[57] ABSTRACT

In the optical recording medium of the invention, land and groove tracks are arranged in a spiral manner, and a completion information region having identification reading completion information indicative of a rear end of an identification region is disposed between data regions. A pair of wobble pits are disposed immediately behind the identification reading completion information region, and therefore the wobble pits can accurately be detected by reading out the wobble pits on the basis of the identification reading completion information.

8 Claims, 25 Drawing Sheets

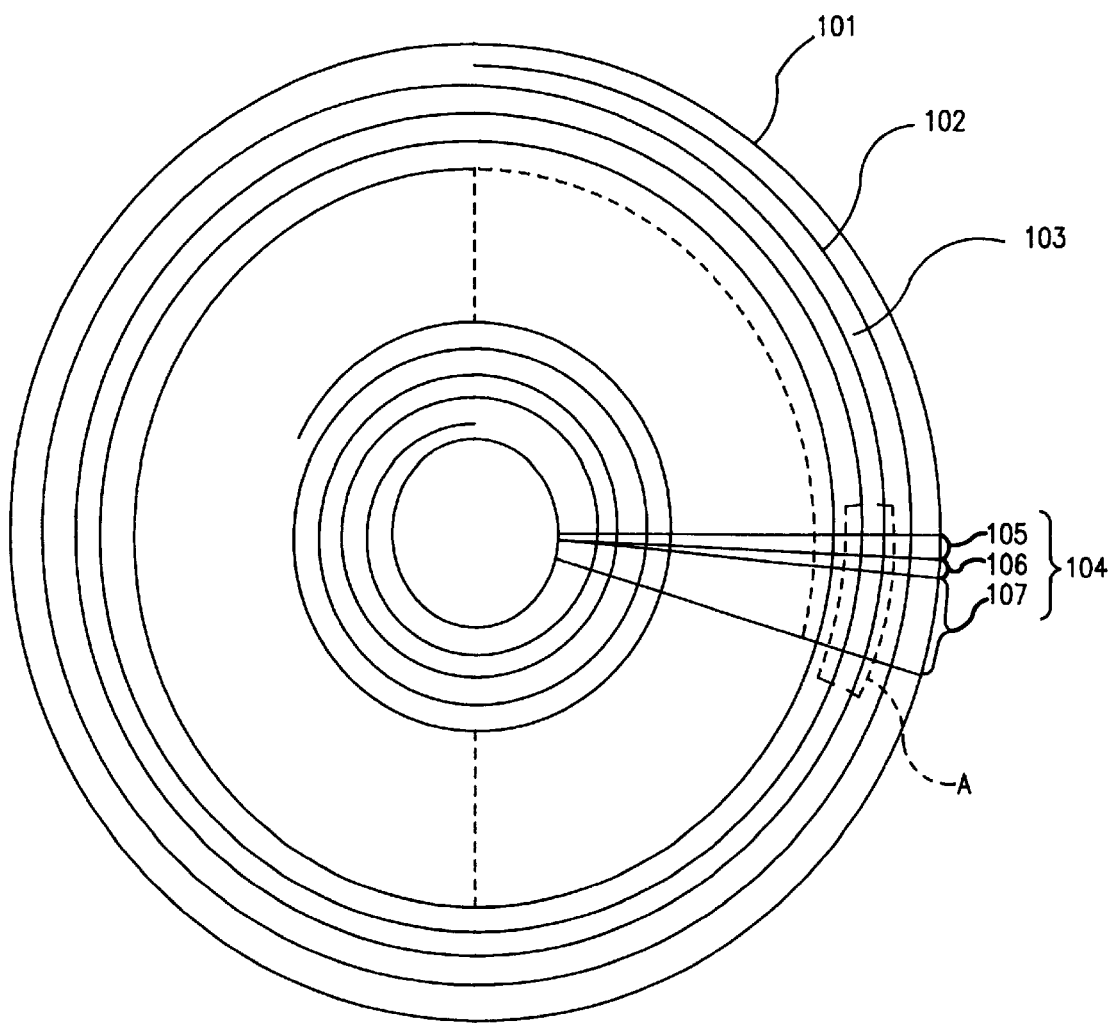
FIG. IA

ANTI-WOBBLE OPTICAL MEDIUM AND TRACKING METHOD AND APPARATUS

This application is a continuation of application Ser. No. 08/364,125, filed Dec. 27, 1994, now abandoned.

BACKGROUND OF THE INVENTION

1. Field of the Invention

The present invention relates to an optical recording medium and an optical information apparatus in which information is optically reproduced, recorded or erased by using a light beam or the like, and a tracking method, and particularly to a method and a device for tracking correction.

2. Description of the Related Art

Recently, techniques of reproducing or recording information in a high density by using a light beam are well known, and in practical use for an optical disk. In order to accurately reproduce data from or record data into tracks of such an optical disk, deflections of the light beam spot with respect to tracks which may be caused by eccentricity of the center hole or tracks of the optical disk, runout of the rotation shaft of the turn table, etc. must be corrected so that the light beam spot accurately follows the tracks (or conducts a tracking).

A typical tracking method is the push-pull method which uses guide grooves preformatted on an optical disk. In the push-pull method, track deviation is detected by using a diffraction distribution of a spot of a light beam which is impinged on a guide groove. It is known that, in the push-pull method, an offset due to the tilt of a disk or a movement of a light beam spot on an optical detector for detecting track deviation is produced so that there arises an error between the actual deviation of the light beam spot with respect to the track and detected track deviation.

As a method which can solve this problem, known is the wobble pit method in which track deviation is detected by means of a pair of wobble pits formed laterally on both sides of the track center. In the wobble pit method, the above-mentioned offset is produced at a low level and a tracking error signal can satisfactorily be obtained. However, a large number of wobble pits must be preformatted on an optical disk, thereby producing a problem in that the area for the preformatting reduces the disk recording capacity.

In order to comply with this, proposed is an optical information recording and reproduction apparatus using a composite tracking method in which the above-mentioned push-pull method and wobble pit method are combined with each other (Japanese Laid-open Patent Publication No. 62-89241). According to the composite tracking method, wobble pit signals are detected from light reflected from an optical disk's surface, a peak level difference between a pair of wobble pit signals is calculated, and the above-mentioned offset is reduced by subtracting the difference from a tracking error signal obtained by the push-pull method, so that a light beam spot always accurately follows the center of the track.

Another configuration is proposed in which land and groove tracks are alternately arranged in the radial direction of an optical disk and information is recorded in both the land and groove tracks so that a high density recording is realized (Japanese Laid-open Patent Publication No. 57-50330).

In the conventional composite tracking method, as described above, the accuracy of the detection of wobble pits largely affects the tracking accuracy. The above documentation of the above conventional optical information recording and reproduction apparatuses fail to describe a specific configuration and method of detecting wobble pits. The conventional apparatus conducts a sampling process on the premise that an optical disk is rotated in an ideally constant manner at a constant speed. Actually, however, it is very difficult to accurately detect wobble pits because of various reasons such as rotation unevenness of the motor for rotating the optical disk, and eccentricity of the optical disk.

In the following, the case where an optical disk which is divided into a plurality of zones is subjected to a continuous recording/reproduction process will be considered. When a continuous recording/reproduction process is conducted across zones by the MCLV method, it is impossible to, in each of the zones, instantaneously change the rotation speed of the motor for rotating the optical disk to the speed corresponding to the zone. Therefore, a light beam spot is moved to the next zone while maintaining a substantially constant rotation speed. Also in the MCAV method, the rotation speed of the motor for rotating the optical disk is kept constant, and therefore a light beam spot is moved to the next zone while maintaining a substantially constant rotation speed in the same manner as the MCLV method. In a continuous recording/reproduction process conducted across zones, consequently, the difference in pit density between the zones causes the frequency of a reproduced pit signal to be suddenly changed. Also in an optical disk divided into a plurality of zones, accordingly, it is very difficult to accurately detect wobble pits.

In actuality, it is impossible to completely eliminate a lack of wobble pits or a formation of pseudo pits due to defects or the like. There arises a problem that erroneous detection of wobble pits which is due to such an optical disk largely impairs the accuracy of the tracking correction.

In an optical disk wherein information is recorded in both land and groove tracks, in order to realize a high density recording, the polarity of a push-pull tracking error signal which is produced by using a guide groove preformatted on the optical disk is inverted at each of the land and groove tracks. This produces a problem that information recorded in both the land and groove tracks cannot be reproduced unless the tracking correction direction is inverted at each of the land and groove tracks.

SUMMARY OF THE INVENTION

The disk-like optical recording medium of this invention, includes: land and groove tracks arranged in a spiral manner; data regions for recording and reproducing data, said data regions being disposed in at least one of said land and groove tracks and arranged intermittently in a track direction; an identification region disposed between said data regions, said identification region having identification information for identifying said data regions; a completion information region disposed between said data regions, said completion information region having identification reading completion information indicative of a rear end of said identification region; and a pair of wobble pits disposed behind said completion information region, said wobble pits being symmetrical about a center line of said track and separated from each other in the track direction.

Alternately, the disk-like optical recording medium of the invention, includes: a spiral track having at least first and second zones, said first zone being divided into m (m is a natural number) sectors per turn, said second zone being disposed outside said first zone and divided into n (n is a natural number different from m) sectors per turn, wherein each of said sectors comprises: a data region for accumulating data; an identification region disposed at a front end of said sector and having identification information for identifying said data region; and a pair of first and second wobble pits disposed between said identification region and said data region, said first and second wobble pits being symmetrical about a center line of said track and separated from each other in a track direction, and when a distance between a rear end of said identification region and a center of said first wobble pit is La, a distance between centers of said first and second wobble pits is Lb, and a distance between the center of said second wobble pit and a front end of said data region is Lc, said distances La, Lb and Lc satisfy the following relationships:

$$La \times n/m < (La+Lb) \times m/n,$$

$$Lb \times n/m < (Lb+Lc) \times m/n.$$

Alternately, the disk-like optical recording medium which is used in an optical information apparatus in which at least one of recording and reproduction is conducted at a disk rotation speed suitable for a used optical recording medium, wherein said optical recording medium comprises: a spiral track having at least first and second zones, said first zone being divided into m (m is a natural number) sectors per turn, said second zone being disposed outside said first zone and divided into n (n is a natural number different from m) sectors per turn, each of said sectors comprises: a data region for accumulating data; an identification region disposed at a front end of said sector and having identification information for identifying said data region; and a pair of first and second wobble pits disposed between said identification region and said data region, said first and second wobble pits being symmetrical about a center line of said track and separated from each other in a track direction, and when a distance between a rear end of said identification region and a center of said first wobble pit is La, a distance between centers of said first and second wobble pits is Lb, and a distance between the center of said second wobble pit and a front end of said data region is Lc, said distance La is greater than a distinguishable distance between the rear end of said identification region and the center of said first wobble pit, said distinguishable distance being decided in accordance with said disk rotation speed, said distance Lb is greater than a distinguishable distance between the centers of said first and second wobble pits, said distinguishable distance being decided in accordance with said disk rotation speed, and said distance Lc is greater than a distinguishable distance between the center of said second wobble pit and the front end of said data region, said distinguishable distance being decided in accordance with said disk rotation speed.

In another aspect of the invention, the optical information apparatus in which at least one of recording and reproduction is conducted by irradiating a disk-like optical recording medium with a light beam including: land and groove tracks arranged in a spiral manner; data regions for recording and reproducing data, said data regions being disposed in at least one of said land and groove tracks and arranged intermittently in a track direction; an identification region disposed between said data regions, said identification region having identification information for identifying said data regions; a completion information region disposed between said data regions, said completion information region having identification reading completion information indicative of a rear end of said identification region; and a pair of wobble pits disposed behind said completion information region, said wobble pits being symmetrical about a center line of said track and separated from each other in the track direction, wherein said optical information apparatus includes: reproduction means for detecting one of a reflected light and a transmitted light from said optical recording medium, and for reproducing a recorded signal; tracking error detection means for detecting positional deviation between a spot of said light beam and said land and groove tracks; completion information read means for reading said identification reading completion information from an output of said reproduction means, and for outputting an identification reading completion signal; wobble tracking error signal generation means for, with using said identification reading completion signal output from said completion information read means as a reference, detecting peak levels of reproduction signals respectively corresponding to said pair of wobble pits from an output signal of said reproduction means, and for obtaining a difference between said peak levels, thereby generating a wobble tracking error signal due to said pair of wobble pits; and racking error correction means for obtaining a difference between an output level of said tracking error detection means and an output level of said wobble tracking error signal generation means, and for correcting an offset included in an output signal of said tracking error detection means in accordance with said output level difference.

Alternately, the optical information apparatus of the invention in which at least one of recording and reproduction is conducted by irradiating a disk-like optical recording medium with a light beam, said optical recording medium including: land and groove tracks arranged in a spiral manner; data regions for recording and reproducing data, said data regions being disposed in at least one of said land and groove tracks and arranged intermittently in a track direction; an identification region disposed between said data regions, said identification region having identification information for identifying said data regions; a completion information region disposed between said data regions, said completion information region having identification reading completion information which is indicative of a rear end of said identification region; and a pair of wobble pits disposed behind said completion information region, said wobble pits being symmetrical about a center line of said track and separated from each other in the track direction, wherein said optical information apparatus includes: reproduction means for detecting one of reflection light and a transmitted light from said optical recording medium, and for reproducing a recorded signal; tracking error detection means for detecting positional deviation between a spot of said light beam and said land and groove tracks; moving means for moving said spot of said light beam on said optical recording medium so as to cross said land and groove tracks; completion information read means for reading said identification reading completion information from an output of said reproduction means, and for outputting an identification reading completion signal; wobble tracking error signal generation means for, using said identification reading completion signal output from said completion information read means as a reference, detecting peak levels of reproduction signals respectively corresponding to said pair of wobble pits from an output signal of said reproduction means, and for obtaining a difference between said peak levels, thereby generating a wobble tracking error signal due to said pair of wobble pits; tracking error correction means for obtaining a difference between an output level of said tracking error detection means and an output level of said wobble tracking error signal generation means, and for outputting a correction signal for correcting an offset included in an output signal of said tracking error detection means in accordance with said output level difference; polarity inversion means for inverting a polarity of the correction signal output from said tracking error correction means; switch means for switching the inverted correction signal output from said polarity inversion means, and the correction signal output from said tracking error correction means; switch control means for, at each of said land and groove tracks, controlling the switching process of said switch means; and movement control means for, in accordance with one of the correction signal and the inverted correction signal which is switched by said switch means, controlling a position of said moving means so that said spot of said light beam on said optical recording medium is positioned in said land and groove tracks.

In another aspect of the invention, the tracking method used for an optical recording medium including: land and groove tracks arranged in a spiral manner; data regions for recording and reproducing data, said data regions being disposed in said land and groove tracks and arranged intermittently in a track direction; an identification region disposed between said data regions, said identification region having identification information for identifying said data regions; a completion information region disposed between said data regions, said completion information region having identification reading completion information indicative of a rear end of said identification region; and a pair of wobble pits disposed behind said completion information region, said wobble pits being symmetrical about a center line of said track and separated from each other in the track direction, wherein said tracking method for following said tracks with a light beam comprises the steps of: generating a push-poll tracking error signal by detecting positional deviation between a spot of said light beam and said land and groove tracks; reproducing a recorded signal by detecting one of a reflected light and a transmitted light from said optical recording medium; generating an identification reading completion signal by reading said identification reading completion information from reproduced signal; generating a wobble tracking error signal, using said identification reading completion signal as a reference, by detecting peak levels of said reproduced signals respectively corresponding to said pair of wobble pits and by obtaining a difference between said peak levels; and correcting said push-pull tracking error signal by obtaining a difference between a level of said push-pull tracking error signal and a level of said wobble tracking error signal, and by eliminating an offset included in said push-pull tracking error signal in accordance with said level difference.

Alternately, the tracking method used for an optical recording medium including: land and groove tracks arranged in a spiral manner; data regions for recording and reproducing data, said data regions being disposed in said land and groove tracks and arranged intermittently in a track direction; an identification region disposed between said data regions, said identification region having identification information for identifying said data regions; a completion information region disposed between said data regions, said completion information region having identification reading completion information indicative of a rear end of said identification region; and a pair of wobble pits disposed behind said completion information region, said wobble pits being symmetrical about a center line of said track and separated from each other in the track direction, wherein said tracking method for following said tracks with a light beam includes the steps of: reproducing a recorded signal by detecting one of a reflected light and a transmitted light from said optical recording medium; generating a push-pull tracking error signal by detecting positional deviation between a spot of said light beam and said land and groove tracks; generating an identification reading completion signal by reading said identification reading completion information from reproduced signal; generating a wobble tracking error signal, using said identification reading completion signal as a reference, by detecting peak levels of said reproduced signals respectively corresponding to said pair of wobble pits and by obtaining a difference between said peak levels; obtaining a difference between a level of said push-pull tracking error signal and a level of said wobble tracking error signal; correcting said push-pull tracking error signal by eliminating an offset included in said push-pull tracking error signal in accordance with said level difference; and inverting a polarity of the corrected tracking error signal depending on whether the light beam impinges on said land track or said groove track.

As described above, in the optical recording medium of the invention, land and groove tracks are arranged in a spiral manner, and a completion information region having identification reading completion information indicative of a rear end of an identification region is disposed between data regions. A pair of wobble pits are disposed immediately behind the identification reading completion information region, and therefore the wobble pits can accurately be detected by reading out the wobble pits on the basis of the identification reading completion information.

The pair of wobble pits may be preformatted at positions which are synchronized with a reference clock signal for preformatting the identification region. This allows a predetermined timing based on the reading of identification information to be accurately set by using a clock signal which is synchronized with a clock signal used in the reproduction of identification information. As a result, an optical information apparatus which conducts a recording/reproduction process on the optical recording medium can accurately easily detect the wobble pits.

The identification reading completion information may serve also as an error code included in the identification region. In this case, the configuration can further be simplified.

In the case where an optical recording medium has a plurality of zones, the optical recording medium of the invention satisfies the foregoing equation. For the recording or reproduction on the whole face of the optical recording medium including transition portions between the zones, therefore, a first wobble pit can be detected at a predetermined timing counted from the detection of the identification region, and a second wobble pit can be detected at a predetermined timing counted from the detection of the first wobble pit, so that the wobble pits are individually detected. Not only in a recording/reproduction process conducted in each of the zones but also in that conducted while continuously passing the zones, even a simple configuration of an optical information apparatus enables a pair of wobble pits to be individually accurately detected so that tracking is correctly conducted.

In the optical information apparatus and the tracking method of the present invention, the completion information read means detects an identification reading completion signal from the completion information region. Using the identification reading completion signal as the reference, the wobble tracking error signal generation means detects peaks of reproduction signals of the pair of wobble pits at predetermined timing. Therefore, influences due to rotation unevenness of the motor for rotating the optical disk, eccentricity of the optical disk, or the like can be reduced, thus the detection accuracy of the wobble pits can be improved. As a result, the calculation means uses a signal indicative of the difference between the peaks of reproduction signals of the pair of wobble pits, and the tracking error correction means corrects the output signal of the tracking error detection means for detecting positional deviation between a light beam spot and a track, whereby a highly accurate tracking control can be realized.

Moreover, when identification information is erroneously read, the completion information read means detects the error reading using an error code and does not output the identification reading completion signal, thus the track offset correction is inhibited. Accordingly, the case where the detection of the wobble pits cannot be correctly conducted due to an error in reading is prevented from occurring.

The provision of the pit counting means for counting the number of pits appearing in an output signal of the reproduction means during the period indicated by the period signal output from the period signal generation means can also inhibit an optical recording medium which lacks wobble pits or has pseudo pits due to defects or the like, from being subjected to the tracking offset correction based on an erroneous detection, whereby an erroneous operation can be prevented from occurring.

In the other optical information apparatus and the tracking method of the present invention, the polarity of a tracking error signal is inverted at each of the land and groove tracks. This is inevitably equivalent to the case where the tracking correction direction is inverted at each of the land and groove tracks. Therefore, the tracking control can be correctly conducted on both the land and groove tracks. Accordingly, highly accurate tracking control can also be done on an optical recording medium wherein information is recorded in both land and groove tracks.

Thus, the invention described herein makes possible the advantages of (1) providing an optical recording medium, an optical information apparatus, and a tracking method in which wobble pits can be accurately detected by a simple configuration and a highly accurate and stable tracking control can be realized; and (2) providing an optical information apparatus, and a tracking method in which a tracking can accurately also be conducted on an optical recording medium in which information is recorded in both land and groove tracks.

These and other advantages of the present invention will become apparent to those skilled in the art upon reading and understanding the following detailed description with reference to the accompanying figures.

BRIEF DESCRIPTION OF THE DRAWINGS

FIG. 1a is a diagram of an optical disk according to Example 1 of the invention.

DESCRIPTION OF THE PREFERRED EMBODIMENTS

Figure 1B:
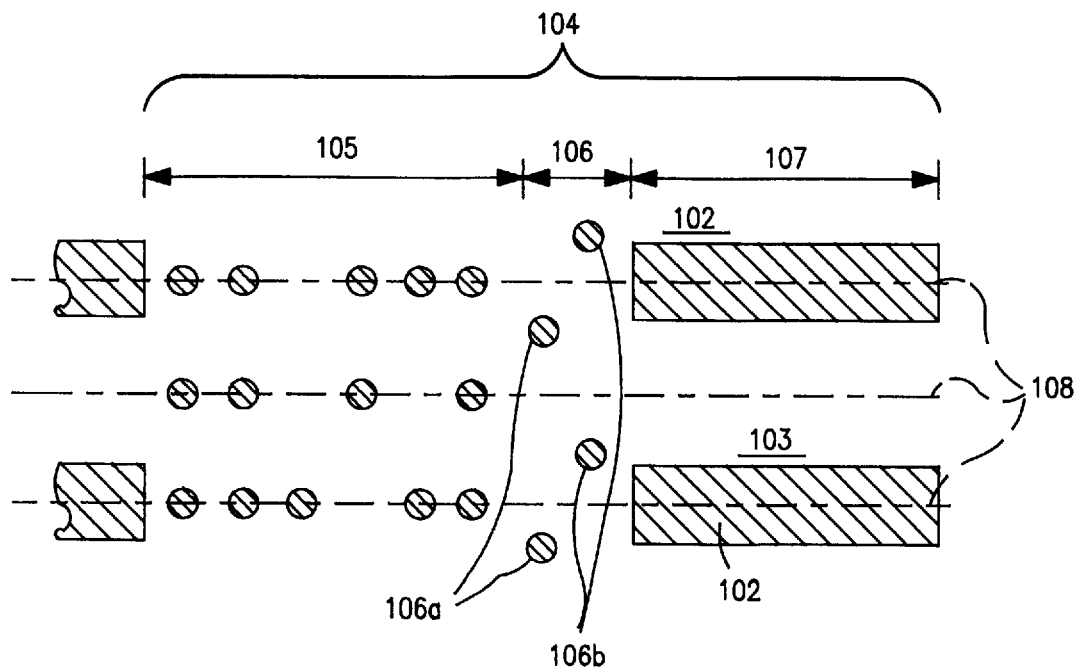
FIG. 1b is an enlarged plan view showing the vicinity of an identification region and a servo region of the optical disk according to Example 1 of the invention.

Examples of the optical disk, the optical disk apparatus, and the tracking method of the invention will be described with reference to the drawings.

EXAMPLE 1

First, an optical disk of Example 1 according to the invention will be described.

FIG. 1a shows an outline of the optical disk according to Example 1 of the invention. As shown in FIG. 1a, the optical disk 101 has a groove track 102, and a land track 103. The groove track 102, and the land track 103 are formed in parallel and in a spiral manner. In each turn, the groove track 102 and the land track 103 of the optical disk 101 are divided into a plurality of sectors 104. Each of the sectors 104 includes an identification region 105, a servo region 106, and a data region 107. Data are recorded in the groove track 102 and the land track 103.

Figure 1C:
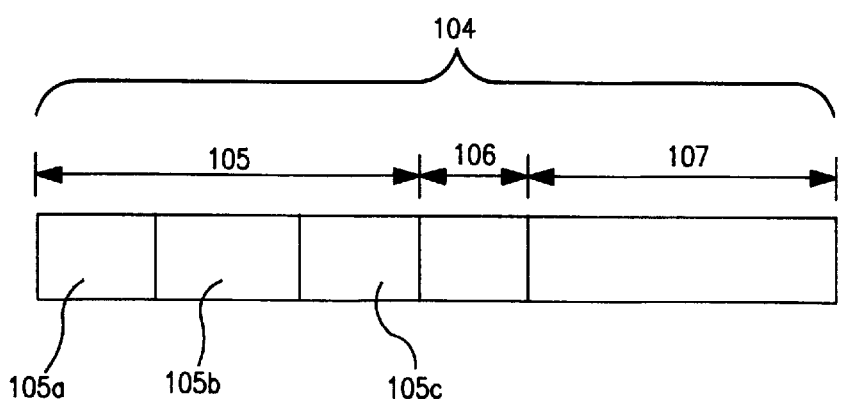
FIG. 1c is a diagram showing the configuration of one sector of the optical disk according to Example 1 of the invention.

FIG. 1b illustrates an enlarged plan view showing the vicinity of the identification region 105 and the servo region 106 of the optical disk 101, and FIG. 1c diagrammatically shows the configuration of one sector. FIGS. 1b and 1c show an example of the format of the sector 104 which is indicated by a region A enclosed by a broken line in FIG. 1a. As shown in FIG. 1c, the sector 104 shown in FIG. 1b consists, in the sequence starting from the front end, of: the identification region 105 having information such as an address mark (track address) 105a of the data region 107, a sector address 105b, and an error code (CRC) 105c for each of these addresses; the servo region 106 having wobble pits 106a and 106b which are required for the correction of the tracking; and the data region 107 for recording and reproducing information. One-dot chain lines 108 indicate the center lines of the tracks 102 and 103, respectively. The wobble pits 106a and 106b are preformatted in such a manner that, for each of the groove tracks 102 and the land tracks 103, they are symmetrical about the center line 108 of the respective track 102 or 103 and shifted by a half of the track pitch in a radial direction so as not to overlap with each other in the radial direction. The wobble pits 106a and 106b are used for correcting an offset which is included in a tracking error signal in the push-pull method utilizing the groove tracks 102 and the land tracks 103.

Figure 2:
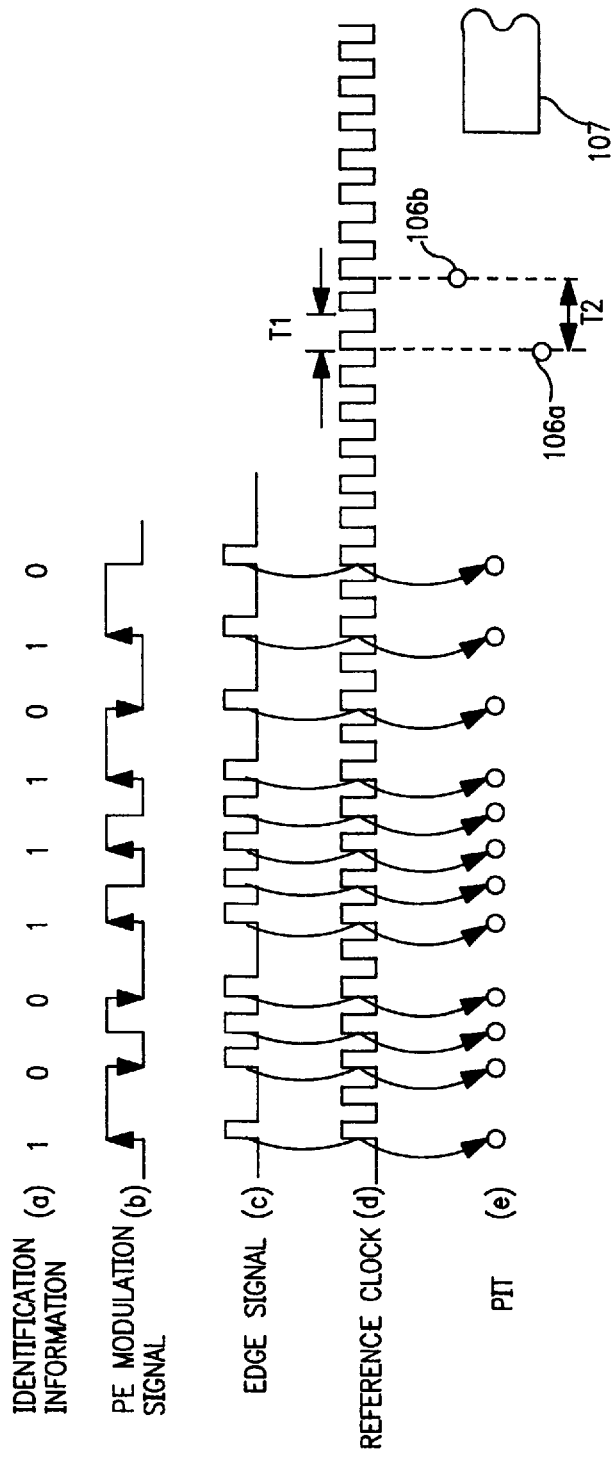
FIG. 2 is a chart showing recording the timings for identification information and wobble pits 106a and 106b preformatted on the optical disk according to Example 1 of the invention.

Then recording timings for the identification information and wobble pits 106a and 106b which are preformatted will be described with reference to FIG. 2 which shows the rearmost portion of the identification region 105. In Example 1, the identification information (a) of the identification region 105 is preformatted by PE (Phase Encoding) modulation.

Pits (e) are formed on the optical disk 101 so as to correspond to an edge signal (c) of a PE modulation signal (b) which is obtained by PE-modulating the identification information (a). A reference clock signal (d) having a period T1 is used for forming the pits (e). The wobble pits 106a and 106b are recorded at positions which are respectively synchronized with the reference clock signal (d). A period T2 indicating the interval between the wobble pits 106a and 106b corresponds to two periods of the reference clock signal (d).

In the optical disk of Example 1 of the invention, as described above, the wobble pits 106a and 106b are disposed immediately behind the error code 105c indicative of the rear end of the identification region 105, and they are recorded at positions which are respectively synchronized with the reference clock signal (d). When a predetermined timing is set with respect to the identification region 105 by using a clock signal which is synchronized with a clock signal based on the reproduction of the identification information, therefore, a gate signal for detecting reproduction signals of the wobble pits 106a and 106b can accurately be generated. Also period T2 indicative of the interval between the wobble pits 106a and 106b is synchronized with the reference clock signal (d). Therefore when the width of the gate signal is set so as to be an integer multiple of the clock signal synchronized with the clock signal for reading identification information, it is easy to individually gate the pair of wobble pits 106a and 106b.

In the above-described optical disk 101 of Example 1 of the invention, information is recorded in and reproduced from both the land and groove tracks. Also a configuration in which information is recorded in and reproduced from one of the land or groove tracks can attain the same effects.

EXAMPLE 2

An optical disk of Example 2 of the invention will be described.

Figure 3A:
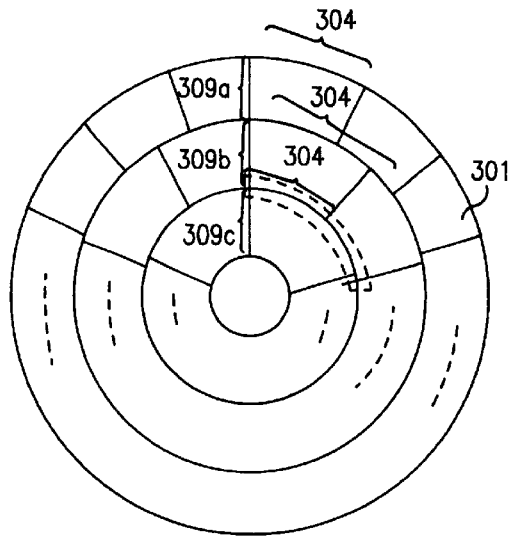
FIG. 3a is a diagram of an optical disk according to Example 2 of the invention.
Figure 3B:
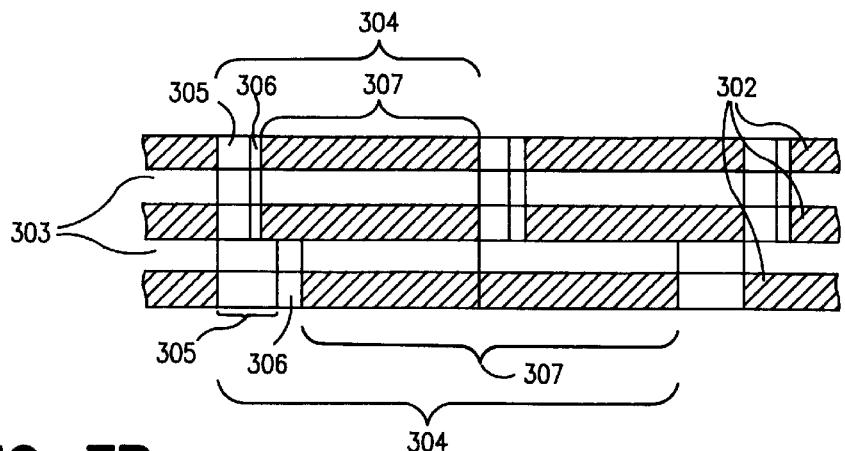
FIG. 3b is an enlarged plan view showing the vicinity of boundaries of zones of the optical disk according to Example 2 of the invention.

FIG. 3a shows an outline of the optical disk of Example 2, and FIG. 3b shows an enlarged plan view of the vicinity of boundaries of zones in a broken line frame shown in FIG. 3a. As shown in FIGS. 3a and 3b, the optical disk 301 of Example 2 of the invention has groove tracks 302, and land tracks 303. Although not shown in FIG. 3a, the groove tracks 302 and the land tracks 303 shown in FIG. 3b are formed in parallel and in a spiral manner. In each turn, the groove tracks 302 and the land tracks 303 of the optical disk 301 are divided into a plurality of sectors 304. Each of the sectors 304 includes an identification region 305, a servo region 306, and a data region 307. Data are recorded in the groove tracks 302 and the land tracks 303. The tracks 302 and 303 are divided into a plurality of zones 309a, 309b and 309c in such a manner that, in each of the zones, the number of sectors per turn are equal to each other. In the same manner as Example 1, each of the sectors 304 consists, in the sequence starting from the front end, of: the identification region 305 having information such as an address mark of the data region 307, a sector address, and an error code for each of these addresses; the servo region 306 having wobble pits 306a and 306b which are required for the correction of the tracking; and the data region 307 for recording and reproducing information.

Figure 3C:
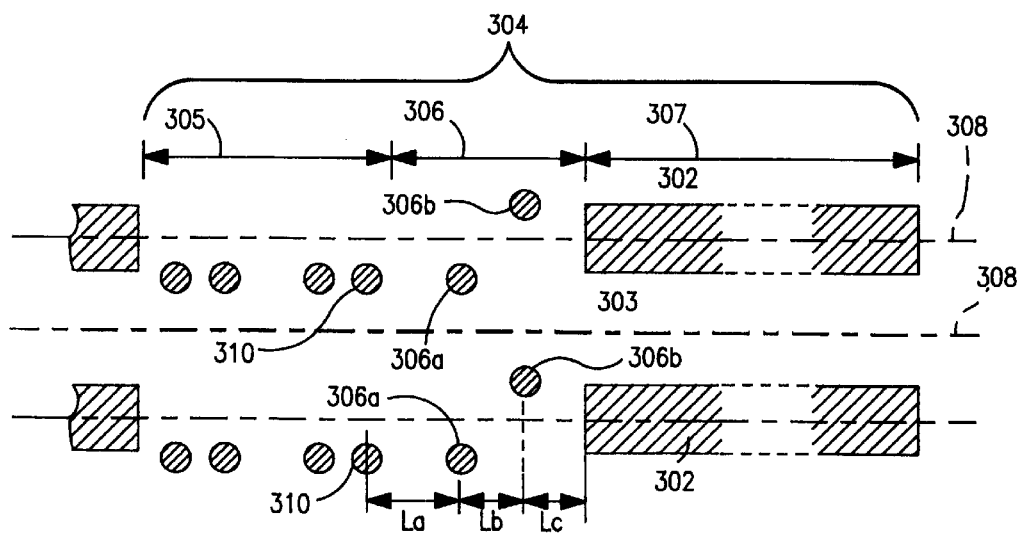
FIG. 3c is an enlarged plan view showing a sector in the innermost zone of the optical disk according to Example 2 of the invention.

FIG. 3c shows an enlarged plan view of the sector 304 in the innermost zone 309c. In FIG. 3c, pits for identification information disposed in the identification region 305 are located on the boundary line between the groove track 302 and the land track 303 so that the data region 307 of the groove track 302, and that of the land track 303 adjacent thereto are identified by using the same identification information. When a tracking error signal is detected from each of the groove tracks 302 and the land tracks 303 by the push-pull method to conduct the tracking control, the tracking error signals have polarities which are opposite to each other. Therefore even when the identification information pits of the data region 307 of the groove track 302, and those of the land track 303 are common to each other, it is possible to judge which track is currently scanned, the groove track 302 or the land track 303 on the basis of the polarities of the tracking control, and hence this configuration produces no problem.

One-dot chain lines 308 indicate the center lines of the tracks 302 and 303, respectively. The wobble pits 306a are located at positions which are continuous to the respective identification information pits in the track direction. The wobble pits 306a and 306b are preformatted in such a manner that, for each of the tracks 302 or 303, they are symmetrical about the center line 308 of their respective tracks 302 or 303 and shifted by a half of the track pitch in a radial direction so as not to overlap with each other in the radial direction. The wobble pits 306a and 306b are used for correcting an offset which is included in a tracking error signal in the push-pull method utilizing the groove tracks 302 and the land tracks 303.

The number of sectors per turn in the innermost zone 309c is m (natural number), and that in the zone 309b adjacent to the innermost zone 309c is n (natural number; and n≠m). For each zone the distance La between the center of the rearmost pit 310 of the identification region 305 and the center of the wobble pit 306a, the distance Lb between the center of the wobble pits 306a and 306b, and the distance Lc between the center of the wobble pit 306b and the front end portion of the data region 307 satisfy the relationships shown in Expressions 1 and 2 below:

$$La \times n/m < (La+Lb) \times m/n \quad \text{[Expression 1]}$$

$$Lb \times n/m < (Lb+Lc) \times m/n \quad \text{[Expression 2]}$$

In each of the zones 309a, 309b and 309c of the optical disk 301, the length of each sector 304 is proportional to the distance between the sector and the center of the optical disk 301. In other words, the pits in the zones 309a, 309b and 309c are preformatted so that the recording/reproduction process can be conducted by the CAV method, and the sector lengths in the innermost track of the zones are substantially equal to each other to obtain a format conforming to the MCAV or MCLV method. In the MCAV method, the optical disk is rotated at a constant rotation speed irrespective of the position of the currently scanned zone. In the MCLV method, the optical disk is rotated at a constant speed in each zone, and the rotation speed in each zone is set in accordance with the number of sectors per turn so that the record/reproduction speed is constant.

As described above, a peak level difference between a pair of wobble pit signals is calculated, and an offset produced in the push-pull method is reduced by subtracting the difference from a tracking error signal obtained by the push-pull method. In order to realize this, the wobble pits 306a and 306b must be detected individually and accurately. To comply with this, a method may be contemplated which is realized by a simple configuration wherein the wobble pits 306a and 306b are individually detected from predetermined reference pits by conducting a gating operation for a given period.

Hereinafter, the relationships shown in Expressions 1 and 2 will be described in detail in the case where the recording/reproduction process is conducted by the MCLV method in which the optical disk is uniformly rotated at a predetermined constant rotation speed in each of the zones 309a, 309b and 309c and the linear velocity is averagely constant over the whole face of the disk.

In the MCLV method, the optical disk 301 is rotated at a rotation speed which is lowered as an outer zone is scanned, so that the linear velocity is substantially constant over the whole face of the optical disk 301. However, it is impossible to, in the boundaries of the zones, instantaneously change the rotation speed of the optical disk 301, and therefore a light beam spot moves to the next zone while substantially maintaining the rotation speed which is optimum in the previous zone. In the case where the wobble pits 306a and 306b are individually detected after an elapse of a fixed period with respect to the rearmost pit 310 of the identification region 305 which is closest to the wobble pits 306a and 306b, when the light beam spot moves from the innermost zone 309c to the outer zone 309b adjacent thereto, the time required for detecting the wobble pits 306a and 306b is changed at a rate of n/m, and, when the light beam spot moves from the outer zone 309b to the innermost zone 309c adjacent thereto, the time required for detecting the wobble pits 306a and 306b is changed at a rate of m/n. In Example 2, as described above, the optical disk 301 is divided into the three zones 309a, 309b and 309c and the recording densities of the zones are substantially averaged so that an inner zone has a lower number of sectors per turn. Therefore, the time required for detecting the wobble pits 306a and 306b is changed the largest degree in the transition portion between the innermost zone 309c and the outer zone 309b adjacent thereto. Accordingly, the innermost zone 309c and the outer zone 309b adjacent thereto will particularly be considered in more detail.

Figure 4A:
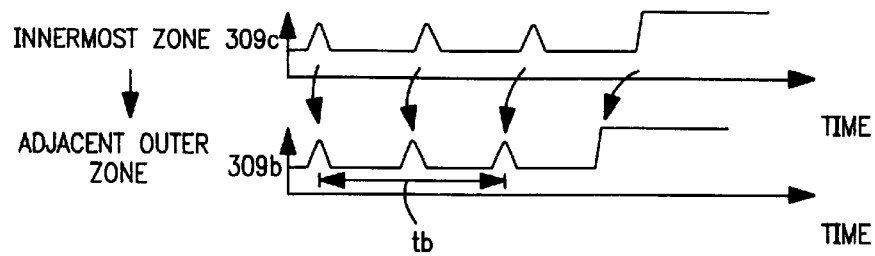
FIGS. 4a to 4d are charts showing timings of reproduction signals of a rearmost pit 310, wobble pits 306a and 306b, and the front end portion of a data region 307 in the boundary of the innermost zone and an outer zone adjacent thereto of the optical disk according to Example 2 of the invention under the condition that the rotation speed of the optical disk is constant.
Figure 4B:
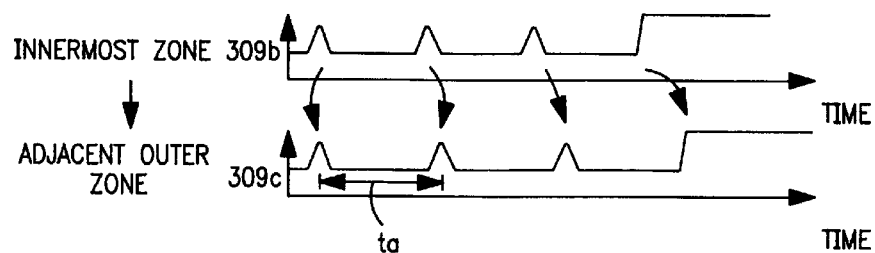
Figure 4C:
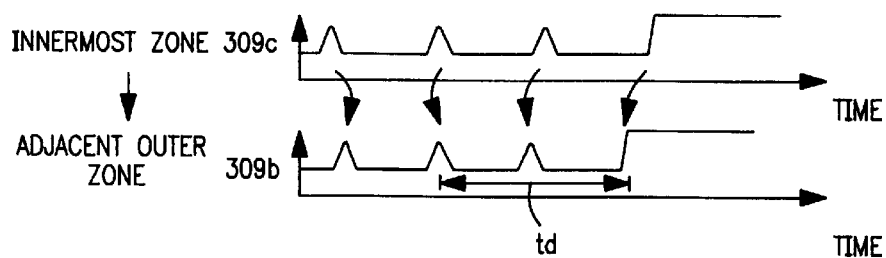
Figure 4D:
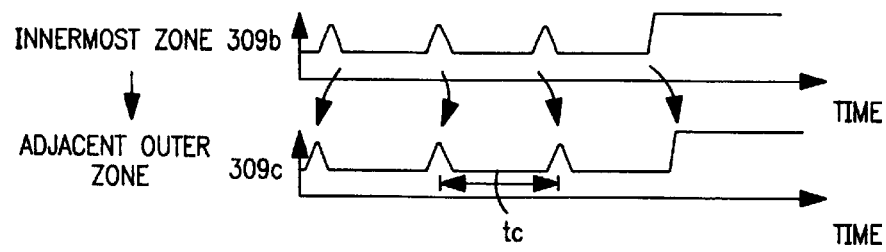

FIGS. 4a to 4d are charts showing timings of reproduction signals of the rearmost pit 310, the wobble pits 306a and 306b, and the front end portion of the data region 307 in the boundary of the innermost zone 309c and the outer zone 309b adjacent thereto under the condition that the rotation speed of the optical disk 301 is constant. FIG. 4a shows the case where the recording/reproduction process is conducted in the direction from the innermost zone 309c to the outer zone 309b adjacent thereto with respect to the time of detecting the rearmost pit 310, FIG. 4b shows the case where the recording/reproduction process is conducted in the direction from the outer zone 309b to the innermost zone 309c adjacent thereto with respect to the time of detecting the rearmost pit 310, FIG. 4c shows the case where the recording/reproduction process is conducted in the direction from the innermost zone 309c to the outer zone 309b adjacent thereto with respect to the time of detecting the wobble pit 306a, and FIG. 4d shows the case where the recording/reproduction process is conducted in the direction from the outer zone 309b to the innermost zone 309c adjacent thereto with respect to the time of detecting the wobble pit 306a.

As shown in FIGS. 4a and 4b, when a period tb from the time of detecting the rearmost pit 310 to the wobble pit 306b in the recording/reproduction process conducted in the direction from the innermost zone 309c to the outer zone 309b adjacent thereto, and a period ta from the time of detecting the rearmost pit 310 to the wobble pit 306a in the recording/reproduction process conducted in the direction from the outer zone 309b to the innermost zone 309c adjacent thereto are in the relationship of Expression 3 below, only one wobble pit 306a is surely detected within a fixed period after the time of detecting the rearmost pit 310 over the whole face of the optical disk, even when the period required for detecting the wobble pits varies in a transition portion between the zones.

$$ta < tb \quad \text{[Expression 3]}$$

A preset rotation speed V0 in the innermost zone 309c in the MCLV method, and a preset rotation speed V1 in the adjacent outer zone 309b in the MCLV method have the relationship of Expression 4 as follows:

$$V1 = V0 \times m/n \quad \text{[Expression 4]}$$

Therefore, the period ta from the time of detecting the rearmost pit 310 to the wobble pit 306a in the recording/ reproduction process conducted in the direction from the outer zone 309b to the innermost zone 309c adjacent thereto can be indicated by following Expression 5:

$$ta = La0/V1 \quad \text{[Expression 5]}$$

La0: the distance between the center of the rearmost pit 310 and the center of the wobble pit 306a in the track direction in the innermost zone 309c On the other hand, the period tb from the time of detecting the rearmost pit 310 to the wobble pit 306b in the recording/reproduction process conducted in the direction from the innermost zone 309c to the outer zone 309b adjacent thereto can be indicated by following Expression 6:

$$tb = (La1 + Lb1)/V0 \quad \text{[Expression 6]}$$

La1: the distance between the center of the rearmost pit 310 and the center of the wobble pit 306a in the track direction in the adjacent outer zone 309b Lb1: the distance between the center of the wobble pits 306a and 306b in the track direction in the adjacent outer zone 309b Consequently, by substituting Expressions 4, 5 and 6 into Expression 3 to eliminate V0 and V1, the relationship of Expression 3 can be replaced with that of Expression 1 above.

Similarly, as shown in FIGS. 4c and 4d, when the period td from the time of detecting the wobble pit 306a to the front end portion of the data region 307 in the recording/reproduction process conducted in the direction from the innermost zone 309c to the outer zone 309b adjacent thereto, and the period tc from the time of detecting the wobble pit 306a to the wobble pit 306b in the recording/reproduction process conducted in the direction from the outer zone 309b to the innermost zone 309c adjacent thereto are in the relationship of Expression 7 below, only one wobble pit 306b is surely detected within a fixed period after the time of detecting the wobble pit 306a over the whole face of the optical disk, even when the period required for detecting the wobble pits varies in a transition portion between the zones.

$$tc < td \quad \text{[Expression 7]}$$

The period tc from the time of detecting the wobble pit 306a to the wobble pit 306b in the recording/reproduction process conducted in the direction from the outer zone 309b to the innermost zone 309c adjacent thereto can be indicated by following Expression 8:

$$tc = Lb0/V1 \quad \text{[Expression 8]}$$

Lb0: the distance between the center of the wobble pits 306a and 306b in the track direction in the innermost zone 309c On the other hand, the period td from the time of detecting the wobble pit 306a to the front end portion of the data region 307 in the recording/reproduction process conducted in the direction from the innermost zone 309c to the outer zone 309b adjacent thereto can be indicated by following Expression 9:

$$tb = (Lb1 + Lc1)/V0 \quad \text{[Expression 9]}$$

Lb1: the distance between the center of the wobble pits 306a and 306b in the track direction in the adjacent outer zone 309b Lc1: the distance between the center of the wobble pit 306b and the front end portion of the data region 307 in the adjacent outer zone 309b Consequently, by substituting Expression 4, 8 and 9 into Expression 7 to eliminate V0 and V1, the relationship of Expression 7 can be replaced with that of Expression 2 above.

In this way, in the case where the wobble pit detection is conducted within a fixed period with respect to the time of detecting the rearmost pit 310, when Expression 1 is satisfied, only one wobble pit 306a is detected within the fixed period also in a transition portion between zones. In the case where the wobble pit detection is conducted within a fixed period with respect to the time of detecting the wobble pit 306a, when Expression 2 is satisfied, only one wobble pit 306b is detected within the fixed period also in a transition portion between zones.

Figure 5:
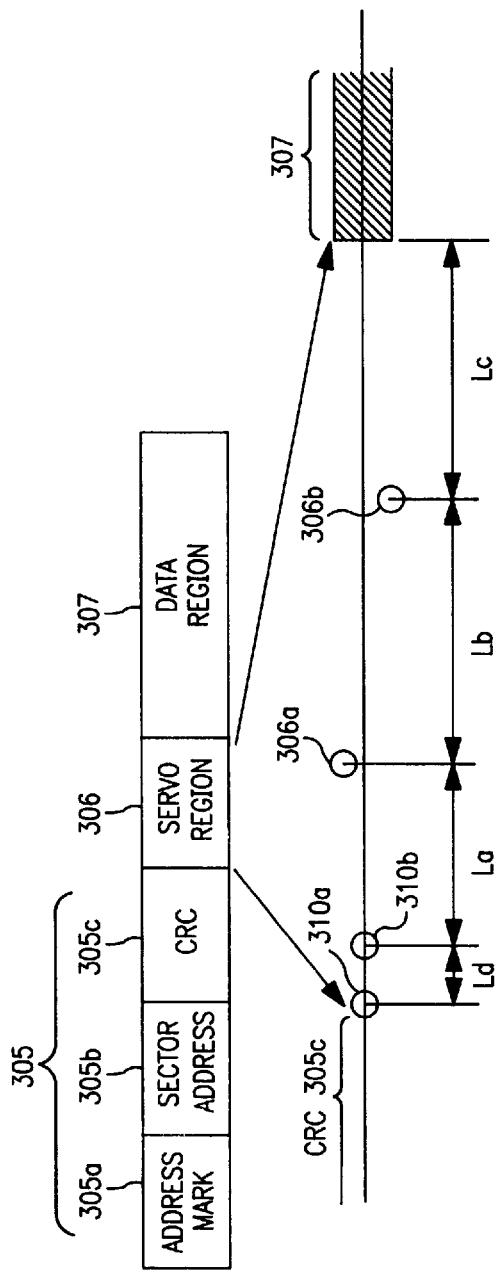
FIG. 5 is a diagram showing a modification of Example 2 of the invention.

FIG. 5 shows another configuration of Example 2. In Example 2 described above, the rearmost pit 310 in the identification region 305, i.e., a pit of an error code 305c is used as the reference pit. A reference pit may be disposed at the front end portion of the servo region 306. In the case of the PE modulation, actually, pits 310a and 310b for completing the PE modulation are formed as illustrated, and hence the completion process pit 310b may be used as the reference pit.

From the point of view of improving the recording density, the distances La, Lb and Lc are preferably set to be small. However, the distances must be at the minimum greater than the minimum pit interval at which an optical disk apparatus can conduct the reading operation. Specifically, when the pit length is 0.45 µm, for example, the distances must have at the minimum the following values: the distance La=0.45×8=3.6 µm; the distance Lb=0.45×11=4.95 µm; and the distance Lc=0.45×11=4.95 µm. In the case shown in FIG. 5, the distance Ld between the completion process pits 310a and 310b must be at the minimum 0.45×2=0.9 µm. However, the present invention is not limited to these values of distances, since the minimum pit interval depends on the conditions of the optical disk apparatus, such as error due to the delay in the circuitry and the margin for reproduction of pits.

As described above, when the pit distances satisfy at least Expressions 1 and 2, only one wobble pit is detected within a fixed period also in a transition portion between zones. Therefore, wobble pits 306a and 306b can be detected individually and accurately not only in the zones, but also in the transition portions between the zones. Since only one wobble pit 306a is detected within a predetermined period, erroneous detection caused by the lack of wobble pits or pseudo pits due to defects or the like can be prevented from occurring, thereby enabling the tracking to be correctly conducted. As compared with the configuration in which where the wobble pits 306a and 306b are individually detected with respect to the time of detecting the rearmost pit 310, the configuration in which the wobble pit 306b can be detected with respect to the time of detecting the wobble pit 306a can reduce the interval between the wobble pits so that the capacity of the whole of the optical disk is increased. Examples of such a configuration are described below as Examples 4, 5 and 6.

The optical disk 301 of Example 2 of the invention is so configured that pits for identification information disposed in the identification region 305 are located approximately on the boundary line between the groove tracks 302 and the land tracks 303, and the data region 307 of the groove track 302, and that of the land track 303 adjacent thereto are formed so as to be identified by using the same identification information. Alternatively, for example, the pits for identification information disposed in the identification region 305 may be located at the center portion of each of the tracks 302 and 303. In such a case, the sizes of the wobble pits 306a and 306b are increased so that reproduction signals of the wobble pits 306a and 306b are approximately equal in level to those of the pits for identification information. Namely, the invention is not restricted to Example 2. Although the optical disk 301 having three split zones have been described, the number of zones is not restricted to three as far as a plurality of zones are formed. In the optical disk 301 of Example 2 of the invention, information is recorded in and reproduced from both the land and groove tracks. Also a configuration in which information is recorded in and reproduced from one of the land or groove tracks can attain the same effects.

EXAMPLE 3

An optical disk apparatus according to Example 3 of the invention will be described below.

Figure 6:
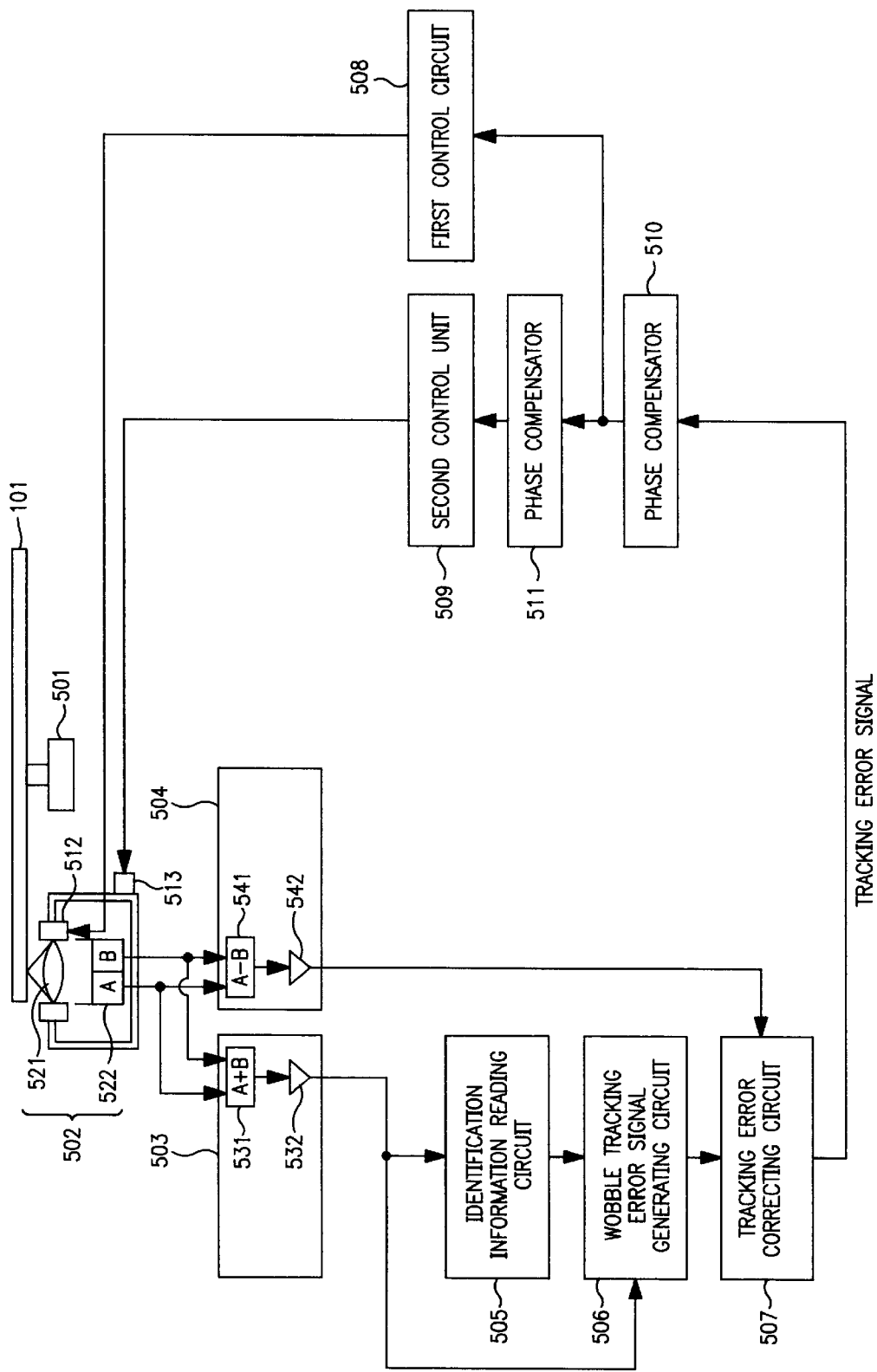
FIG. 6 is a diagram of an optical disk apparatus according to Example 3 of the invention.

FIG. 6 shows the configuration of the optical disk apparatus of EXAMPLE 3. In order to simplify the description, an example which uses the optical disk 101 described above will be described.

As shown in FIG. 6, the optical disk apparatus includes a motor 501 for rotating the optical disk 101, and an optical head 502 which emits a light beam to the optical disk 101 and detects light reflected therefrom. The optical head 502 includes an objective lens 521 which converges the light beam emitted from a light source onto the optical disk 101, and a two-split optical detector 522 which detects the light beam which is irradiated onto the optical disk 101 and then reflected therefrom.

Furthermore, the optical disk apparatus includes a reproduction signal processing circuit 503 which obtains information, identification information, and reproduction signals of the wobble pits from an output of the optical head 502, and a tracking error detection circuit 504 which detects positional deviation between the light beam spot and the tracks 102 and 103 from the output of the optical head 502. The reproduction signal processing circuit 503 includes an adder 531 which obtains the sum of two outputs of the two-split optical detector 522, and an amplifier 532 which amplifies the output of the adder 531. The tracking error detection circuit 504 includes a subtracter 541 which obtains the difference between the outputs of the two-split optical detector 522, and an amplifier 542 which amplifies an output of the subtracter 541.

The optical disk apparatus further includes an identification information reading circuit 505, a wobble tracking error signal generating circuit 506, and a tracking error correcting circuit 507. The identification information reading circuit 505 reads out identification information of the identification region 105 from the output of the reproduction signal processing circuit 503. The wobble tracking error signal generating circuit 506 obtains a difference between peak levels of reproduction signals of a pair of wobble pits 106a and 106b from the output of the reproduction signal processing-circuit 503, thereby generating a tracking error signal due to the wobble pits 106a and 106b. The tracking error correcting circuit 507 receives the output of the tracking error detection circuit 504 and that of the wobble tracking error signal generating circuit 506 and corrects a track offset included in an output signal from the tracking error detection circuit 504.

In addition, the optical disk apparatus includes first and second control circuits 508 and 509, phase compensators 510 and 511, an actuator 512 which moves vertically and laterally the objective lens 521, and a linear motor 513 which moves the optical head 502 and stationary unit of the actuator 512, in a radial direction of the optical disk 101.

The optical disk 101 is mounted on the rotation shaft of the motor 501 and rotated at a predetermined rotation rate. The objective lens 521 is mounted on a movable unit of the actuator 512. The actuator 512 consists of a tracking coil disposed in the movable unit, and a permanent magnet attached to the stationary unit. When a current flows through the coil, the objective lens 521 is moved by an electromotive force acting on the coil, in the radial direction of the optical disk 101 or in such a manner that the light beam spot moves across the tracks 102 and 103 of the optical disk 101. Also a focusing coil is disposed in the movable unit of the actuator 512. When a current flows through the coil, the objective lens 521 is moved by an electromotive force acting on the coil, in a direction perpendicular to the face of the optical disk 101. The objective lens 521 is focus-controlled so that the laser beam impinged on the optical disk 101 always has a predetermined converging state. The optical head 502 and the stationary unit of the actuator 512 are moved as one body by the linear motor 513 in the radial direction of the optical disk 101.

Figure 7:
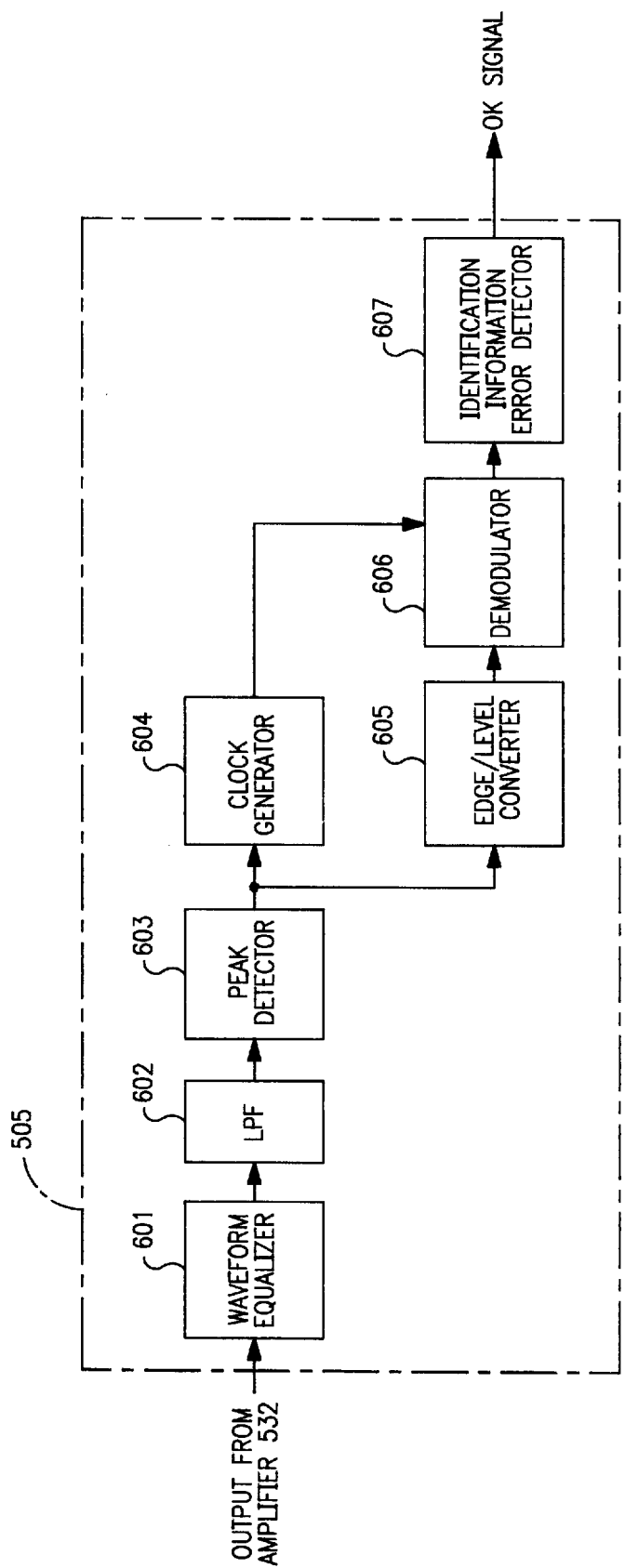
FIG. 7 is a diagram showing in detail the configuration of an identification information reading circuit 505 of the optical disk apparatus according to Example 3 of the invention.

The identification information reading circuit 505 will be described below. FIG. 7 is a diagram showing in detail the configuration of the identification information reading circuit 505.

As shown in FIG. 7, the identification information reading circuit 505 includes a waveform equalizer 601, a low pass filter (LPF) 602, a peak detector 603, a clock generator 604, an edge/level converter 605, a demodulator 606, and an identification information error detector 607. The waveform equalizer 601 equalizes the waveform of the reproduction signal obtained by the amplifier 532 of the reproduction signal processing circuit 503. The LPF 602 receives an output from the waveform equalization 601, and cuts off noise components in the high frequency region. The peak detector 603 differentiates a reproduced signal to detect a peak. The clock generator 604 generates a single-frequency clock signal synchronized with a signal obtained by the peak detector 603. The demodulator 606 samples an output of the edge/level converter 605 by the clock signal of the clock generator 604 and demodulates the identification information. In Example 3, a CRCC (Cyclic Redundancy Check Code) for Judging whether the identification information is correctly read out or not is added as an error code into the identification region 105. The identification information error detector 607 outputs an OK signal only when the identification information is judged to be correctly read out on the basis of the CRCC.

An output signal from the identification information reading circuit 505 is supplied to the wobble tracking error signal generating circuit 506 which detects track deviation from the wobble pits 106a and 106b. The wobble tracking error signal generating circuit 506 detects peaks of reproduction signals of the wobble pits 106a and 106b on the basis of identification information, and generates a signal corresponding to the difference between the levels of the two signals.

The corrected tracking error signal which is an output of the tracking error correcting circuit 507 is supplied to the first control circuit 508 for controlling the operation of driving the actuator 512, via the phase compensator 510 for compensating the phase of the tracking control system. In accordance with the output, the first control circuit 508 controls the actuator 512 so that the spot of the light beam converged onto the optical disk 101 is always positioned on the center line of the track 102 or 103. An output of the tracking error correcting circuit 507 is supplied also to the second control circuit 509 via the phase compensators 510 and 511. The second control circuit 509 controls the linear motor 513 in accordance with the output so that the objective lens 521 is moved, setting the liberated state as the center.

Figure 8:
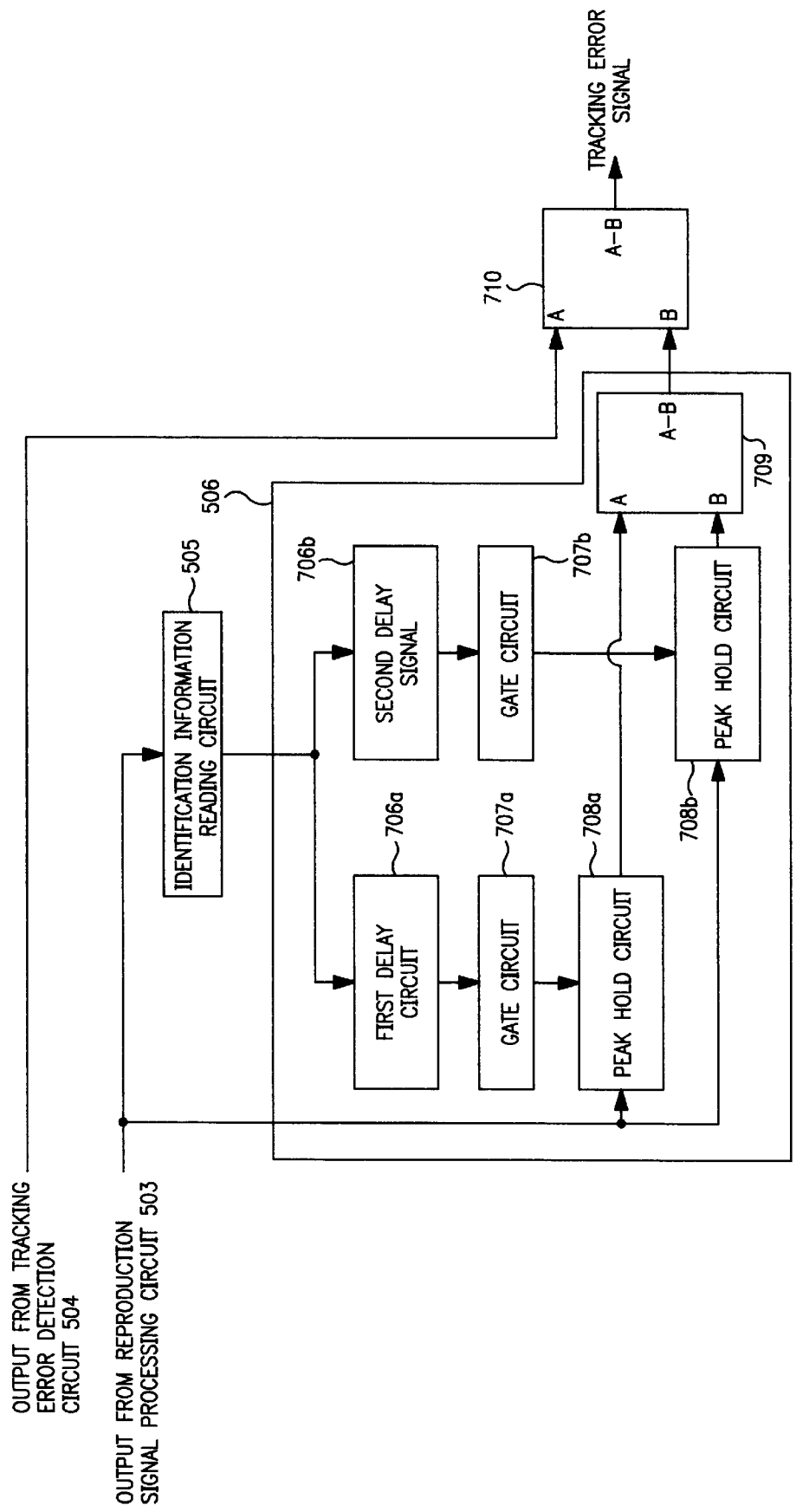
FIG. 8 is a diagram showing in detail the configuration of a wobble tracking signal generating circuit 506 and a tracking error correcting circuit 507 of the optical disk apparatus according to Example 3 of the invention.

The wobble tracking error signal generating circuit 506 and the tracking error correcting circuit will be described below in detail. FIG. 8 is a diagram showing in detail the configuration of the wobble tracking error signal generating circuit 506 and the tracking error correcting circuit 507.

As shown in FIG. 8, the wobble tracking error signal generating circuit 506 includes first and second delay circuits 706a and 706b, gate circuits 707a and 707b, peak hold circuits 708a and 708b, and a subtraction circuit 709. The first and second delay circuits 706a and 706b receive the output from the identification information reading circuit 505, and conduct a predetermined time delay operation. The gate circuit 707a generates a gate signal in synchronization with the output of the first delay circuit 706a. The gate circuit 707b generates a gate signal in synchronization with an output of the second delay circuit 706b. The peak hold circuit 708a holds the peak level of a reproduction signal gated by the gate signal of the gate circuit 707a. The peak hold circuit 708b holds the peak level of the reproduction signal gated by the gate signal of the gate circuit 707b. The subtraction circuit 709 obtains the difference between the peak values of the reproduction signal detected by the peak hold circuits 708a and 708b. The tracking error correcting circuit 507 is configured by a subtraction circuit 710. The subtraction circuit 710 subtracts the output of the subtraction circuit 709 from the output signal of the tracking error detection circuit 504.

Figure 9:
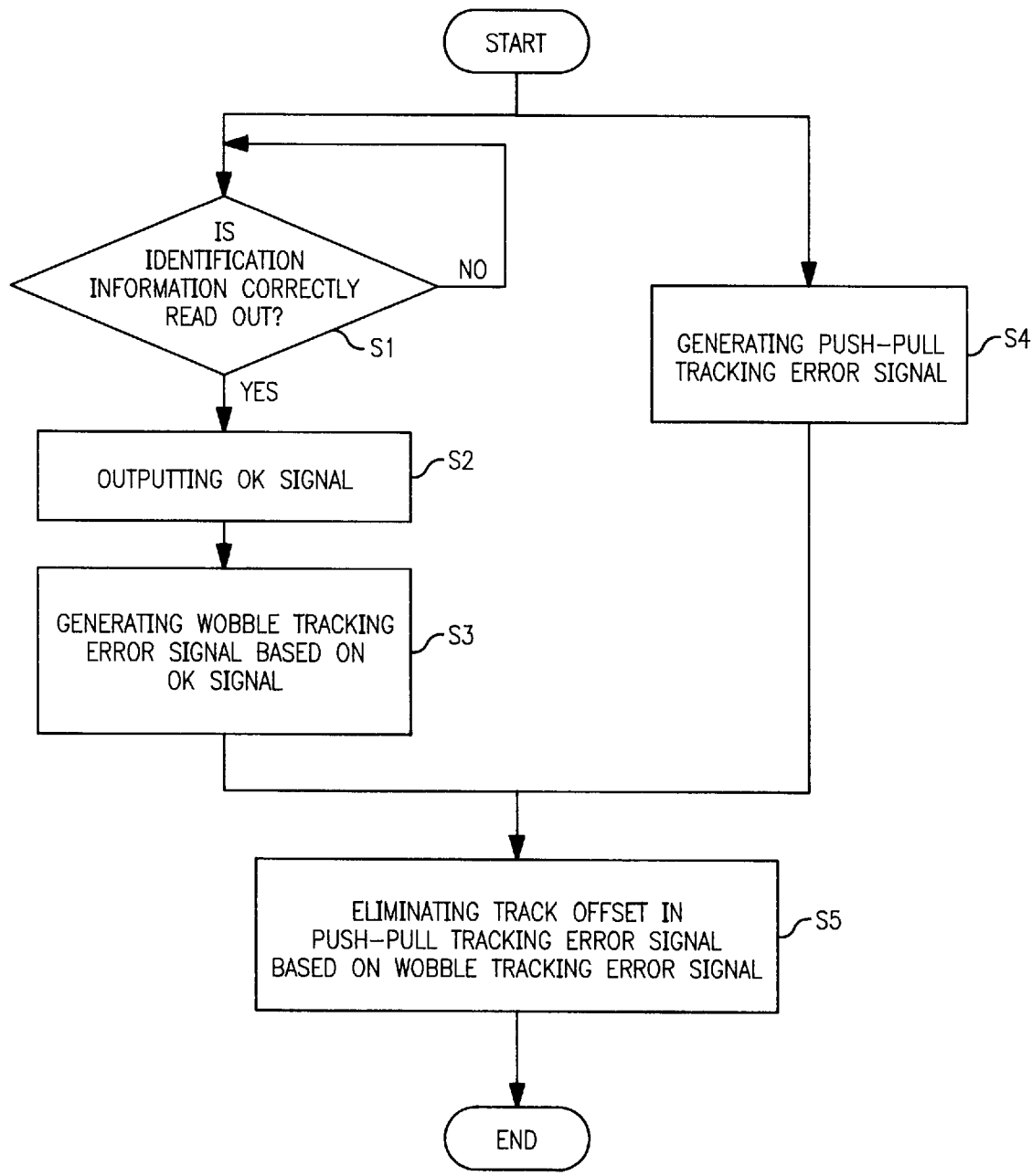
FIG. 9 is a basic flow chart showing a tracking method according to the invention.
Figure 10:
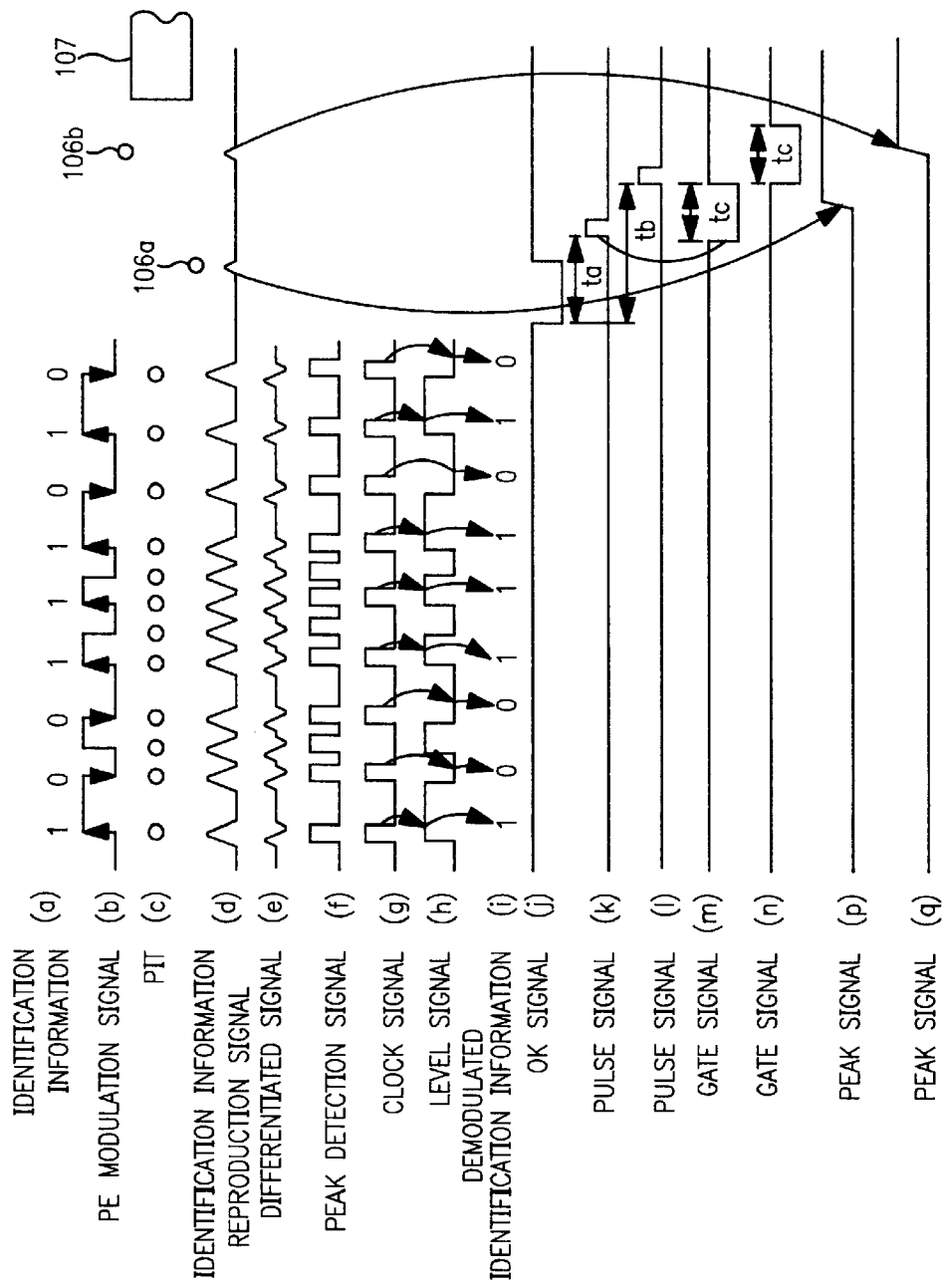
FIG. 10 is a chart showing operations of various portions of the optical disk apparatus according to Example 3 of the invention.

Next, the operation of the above-described optical disk apparatus of Example 3 will be described. FIG. 9 shows a basic flow chart of the tracking method of the invention. FIG. 10 is a chart showing operations of various portions of the optical disk apparatus with regard to the vicinity of the rearmost portion of the identification region 105 and the servo region 106 of the groove track 102. In Example 3, the PE (Phase Encoding) modulation which can extract a bit clock from a reproduction signal is used.

Pits (c) are formed so as to respectively correspond to edges of the PE-modulated signal (b) obtained by PE-modulated identification information (a) of the identification region 105. First, at Step S1, the identification information is read out. This reading operation will be described.

The waveform equalizer 601 reads out an identification information reproduction signal (d) from the pits (c). The PE modulation is a modulation method in which, as shown in the PE-modulated signal (b), the rising of a pulse corresponds to bit 1 of the identification information (a) and the falling of a pulse corresponds to bit 0, and, when bits of the same value continue, the pulse level is inverted at a boundary of bits of the identification information (a). The identification information reproduction signal (d) passes through the LPF 602, and is differentiated in the peak detector 603 to generate a differentiated signal (e). A zero-cross detection of the differentiated signal (e) is conducted to obtain a peak detection signal (f). The edge/level converter 605 generates a level signal (h) from the peak detection signal (f). The clock generator 604 generates a clock signal (g) from the peak detection signal (f). The demodulator 606 samples the level signal (h) by the clock signal (g) to demodulate identification information (i), and the preformatted identification information (a) is read as the identification information (i).

When the identification information is correctly read out, at Step S2, the identification information error detector 607 outputs an OK signal (j).

Next, at Step S3, a wobble tracking error signal is generated based on the OK signal. The operation of Example 3 will be described.

After predetermined delays conducted by the first and second delay circuits 706a and 706b with respect to the OK signal (j), pulse signals (k) and (l) are supplied to the gate circuits 707a and 707b, respectively, and gate signals (m) and (n) for respectively holding the peak levels of the pair of wobble pits 106a and 106b are generated.

The delay periods ta and tb which are the periods to be delayed by the first and second delay circuits 706a and 706b are set in the first and second delay circuits 706a and 706b so as to correspond to the rotation speed of the optical disk 101 during the recording/reproduction process. The widths tc of the gate signals (m) and (n) of the gate circuits 707a and 707b are set so that only one wobble pit is detected in each of the widths of the gate signals (m) and (n).

The reproduction signal (d) of the wobble pit 106a is gated by the gate signal (m) of the gate circuit 707a, and the peak hold circuit 708a holds the peak of the gated-reproduction signal of the wobble pit 106a. The reproduction signal (d) of the wobble pit 106b is gated by the gate signal (n) of the gate circuit 707b, and the peak hold circuit 708b holds the peak of the gated reproduction signal of the wobble pit 106b. The subtraction circuit 709 obtains the difference between peak signals (p) and (q) corresponding to the wobble pits 106a and 106b which are peak-held, thus generating the wobble tracking error signal.

On the other hand, at Step S4, a push-pull tracking error signal is generated by the subtracter 541.

Finally, at Step S5, the subtraction circuit 710 subtracts the wobble tracking error signal from the push-pull tracking error signal, and outputs a tracking error signal in which a track offset included in the push-pull tracking error signal is eliminated. In accordance with the corrected tracking error signal, the spot of the light beam impinged onto the optical disk 101 is controlled so as to be positioned on the center line of the groove track 102.

In the above, the description has been made on the groove track 102. The description is also applicable to the land track 103.

As described above, in the optical disk apparatus according to Example 3 of the invention, after the operation of reading the information identification region 105 is completed and the predetermined delay periods set in the first and second delay circuits 706a and 706b are then elapsed, the gate circuits 707a and 707b respectively gate the reproduction signals of the pair of wobble pits 106a and 106b, and the peak hold circuits 708a and 708b hold the peaks of the gated reproduction signals of the pair of wobble pits 106a and 106b. The periods during which the wobble pits 106a and 106b are detected from the information identification region 105 and which are preset in the first and second delay circuits 706a and 706b are very much shorter than the period required for the optical disk 101 to make one turn, because the wobble pits 106a and 106b are located behind the rear end portion of the information identification region 105. Therefore, influences of rotation unevenness due to fluctuation of the motor 501, eccentricity of the optical disk 101, or the like can be reduced to a very low level, resulting in that the tracking can be conducted in a highly accurate manner. When the identification information is correctly read out, the identification information error detector 607 outputs the OK signal (j). In contrast, when the identification information is erroneously read out, the OK signal (j) is not output, and the track offset correction is inhibited. When the identification information is erroneously read out, consequently, the occasion where the wobble pits are not correctly detected can be prevented from occurring.

EXAMPLE 4

Figure 11:
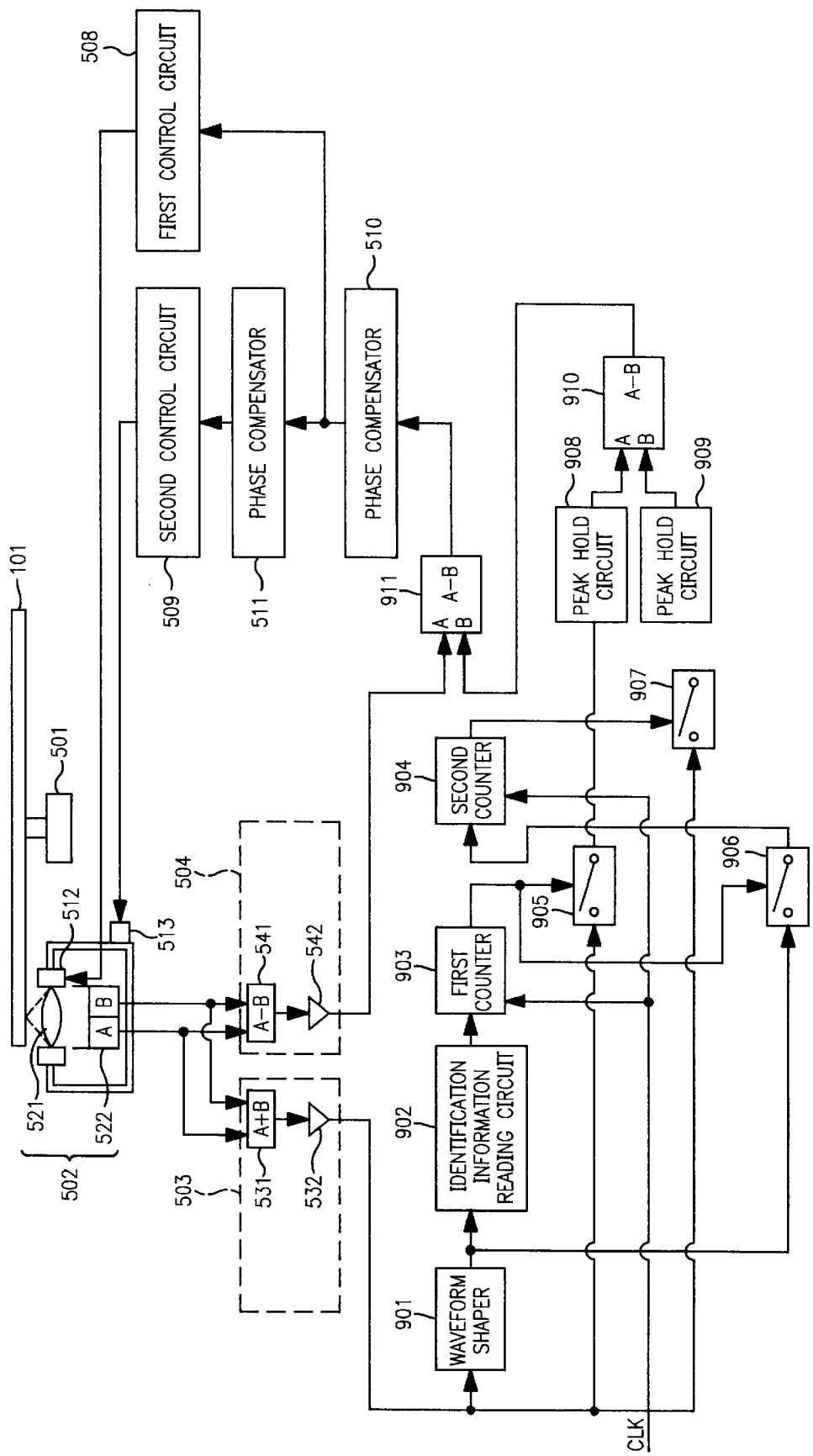
FIG. 11 is a diagram of an optical disk apparatus according to Example 4 of the invention.

An optical disk apparatus according to Example 4 of the invention will be described below. FIG. 11 shows the configuration of an optical disk apparatus of Example 4. In the optical disk apparatus of Example 4 shown in FIG. 11, components which are similar in configuration to those described in the optical disk apparatus Example 3 shown in FIG. 6 are denoted by the same numerals, and the description of these components is omitted. In Example 4, the optical disk 301 described above will be used.

As shown in FIG. 11, the optical disk apparatus includes a waveform shaper 901, an identification information reading circuit 902, first and second counters 903 and 904, gate circuits 905, 906 and 907, peak hold circuits 908 and 909, and subtraction circuits 910 and 911. The waveform shaper 901 conducts a waveform shaping operation on an output of the reproduction signal processing circuit 503 to convert the output into binarized data. The identification information reading circuit 902 reads out identification information of the identification region 305 from an output of the waveform shaper 901. The first and second counters 903 and 904 respectively conduct a counting operation for a predetermined count period. The gate circuit 905 gates a reproduction signal output from the reproduction signal processing circuit 503 during the count period of the first counter 903. The gate circuit 906 gates the binarized reproduction signal output from the waveform shaper 901 during the count period of the first counter 903. The gate circuit 907 gates a reproduction signal output from the reproduction signal processing circuit 503 during the count period of the second counter 904. The peak hold circuit 908 holds the peak level of the reproduction signal output from the gate circuit 905. The peak hold circuit 909 holds the peak level of a reproduction signal output from the gate circuit 907. The subtraction circuit 910 obtains a difference between the peak values of reproduction signals detected by the peak hold circuits 908 and 909. The subtraction circuit 911 subtracts the output of the subtraction circuit 910 from the output signal of the tracking error detection circuit 504 and output the result signal to the phase compensator 510.

Figure 12:
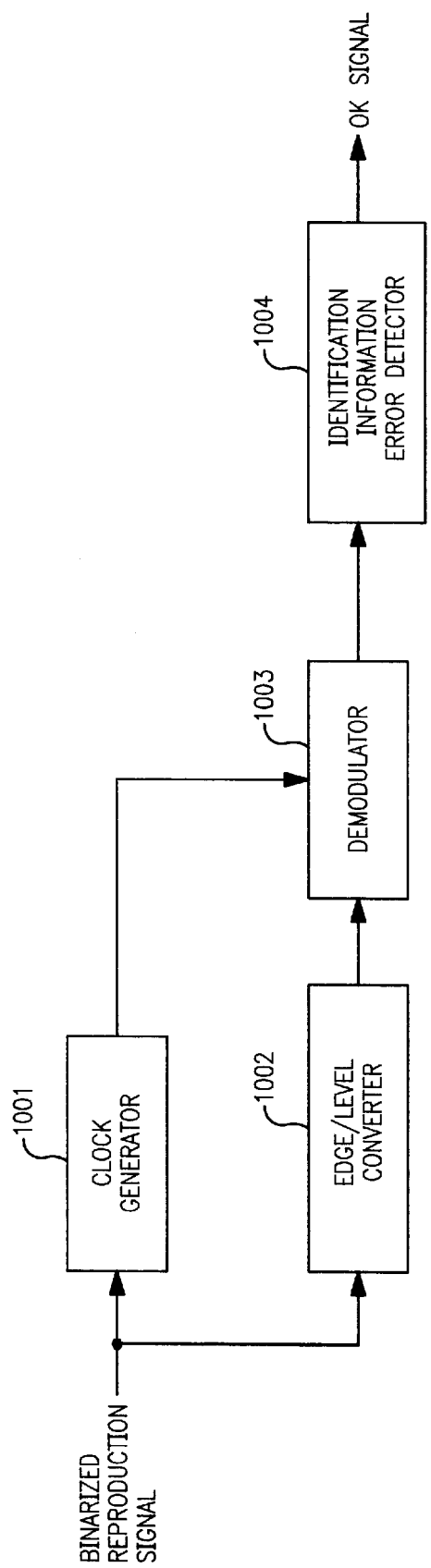
FIG. 12 is a diagram showing in detail the configuration of an identification information reading circuit 902 of the optical disk apparatus according to Example 4 of the invention.

The identification information reading circuit 902 will be described below. FIG. 12 is a diagram showing in detail the configuration of the identification information reading circuit 902.

As shown in FIG. 12, the identification in formation reading circuit 902 includes a clock generator 1001, an edge/level converter 1002, a demodulator 1003, and an identification information error detector 1004. The clock generator 1001 generates a single-frequency clock signal synchronized with the binarized reproduction signal. The demodulator 1003 samples an output of the edge/level converter 1002 by the clock signal of the clock generator 1001 and demodulates the identification information. In Example 4, a CRCC (Cyclic Redundancy Check Code) for judging whether the identification information is correctly read out or not is added as an error code into the identification region. The identification information error detector 1004 outputs an OK signal only when the identification information is judged to be correctly read out on the basis of the CRCC.

Figure 13:
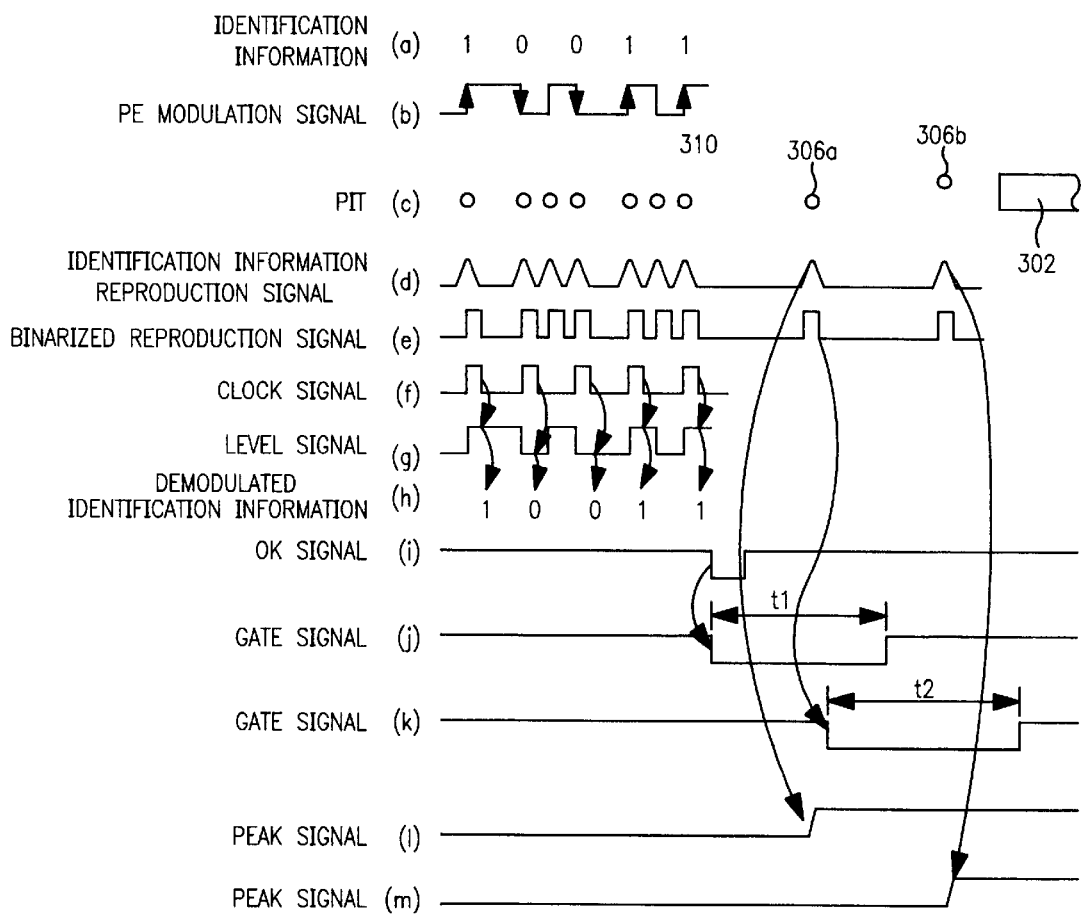
FIG. 13 is a chart showing operations of various portions of the optical disk apparatus according to the Example 4 of the invention in the case where an optical disk 301 is constantly rotated by a motor 501.

Next, the operations in the above-described optical disk apparatus will be described with reference to the basic flow chart of the present invention. FIG. 13 is a chart showing operations of various portions of the optical disk apparatus of Example 4 in the case where the optical disk 301 is constantly rotated by the motor 501. In Example 4, PE modulation which can extract a bit clock from a reproduction signal is used.

Pits (c) are formed so as to respectively correspond to edges of the PE-modulated signal (b) obtained by PE-modulated identification information (a) of the identification region 305.

First, at Step S1 in FIG. 9, the identification information is read out. This reading operation will be described below.

As shown in FIG. 13, waveform equalizer 601 reads out an identification information reproduction signal (d) from the pits (c). The identification information reproduction signal (d) is converted into a binarized reproduction signal (e) by the waveform shaper 901. The edge/level converter 1002 generates a level signal (g) from the binarized reproduction signal (e), and the clock generator 1001 generates a clock signal (f) from the binarized reproduction signal (e). The demodulator 1003 samples the level signal (g) by the clock signal (f) to demodulate identification information (h), and the preformatted identification information (a) is read as the identification information (h).

When the operation of reading the identification information is completed, at Step S2 identification information error detector 1004 outputs an OK signal (i).

Next, at Step S3, a wobble tracking error signal is generated based on the OK signal (i). The operation of Example 4 will be described.

Although not shown, using the OK signal (i) as the reference, the first counter 903 starts a count operation on the basis of a clock signal (CLK) of a fixed frequency, and the gate signal (j) which continues until a count of a predetermined number is completed is supplied to the gate circuits 905 and 906. The peak hold circuit 908 holds the peak level of a reproduction signal of the wobble pit 306a which is gated by the gate circuit 905. At the time when a first pit is detected during a period t1 of the gate signal (j), the second counter 904 starts a count operation on the basis of the clock signal (CLK) of the fixed frequency in the same manner as the first counter 903. During a period t2 which continues until a count of a predetermined number is completed, the gate signal (k) is supplied to the gate circuit 907. The peak hold circuit 909 holds the peak level of a reproduction signal of the wobble pit 306b which is gated by the gate circuit 907. The subtracting circuit 910 obtains the difference between the held peak signals (1) and (m) respectively corresponding to the wobble pits 306a and 306b, thus generating the wobble tracking error signal.

On the other hand, at Step S4, a push-pull tracking error signal is generated by the subtracter 541.

Finally, at Step S5, the subtraction circuit 911 subtracts the wobble tracking error signal from the push-pull tracking error signal, and outputs a tracking error signal in which a track offset included in the push-pull track error signal is eliminated. In accordance with the tracking error signal, the spot of the light beam impinged onto the optical disk is controlled so as to be positioned on the center line of the groove track 302.

As described in detail with reference to FIG. 13, using the OK signal (i) approximately synchronized with respect to the rearmost pit 310 of the identification region 305, the gate signal (j) which continues for a predetermined period is generated to detect the wobble pit 306a. The gate signal (k) which continues for a predetermined period after the detection of the wobble pit 306a is generated to detect the wobble pit 306b. Therefore, the variation of the detection of the second wobble pit 306b is smaller than that obtained in the case where the wobble pit 306b is detected with respect to the OK signal (i) as the reference, thereby improving the detection accuracy.

In Example 4, the description has been made on the groove track 302. The description is also applicable to the land track 303.

As described above, in the optical disk apparatus according to Example 4, after the operation of reading the information identification region 305 is completed and while the first counter 903 then conducts a count operation for the predetermined period, the gate circuit 905 gates the reproduction signal of the first wobble pit 306a and the gate circuit 906 gates the binarized reproduction signal of the first wobble pit 306a. After the first wobble pit 306a is detected from the information identification region 305 and while the second counter 904 then conducts a count operation for the predetermined period, the gate circuit 907 gates the reproduction signal of the second wobble pit 306b, and the peak hold circuits 908 and 909 hold the peak levels of the gated reproduction signals of the pair of wobble pits 306a and 306b. The periods during which the wobble pits 306a and 306b are detected from the information identification region 305 and which are preset in the first and second counters 903 and 904 are shorter than the period required for the optical disk 301 to make one turn, because the wobble pits 306a and 306b are located behind the rear end portion of the information identification region 305. Therefore, influences of rotation unevenness due to fluctuation of the motor 501, eccentricity of the optical disk 301, or the like can be reduced to a very low level, resulting in that the wobble pits can be detected in a highly accurate manner. Also, since the detection of the wobble pit 306b is started at the time when the wobble pit 306a is detected, particularly, the detection of the wobble pit 306b has the same detection accuracy as that of the detection of the wobble pit 306a, with the result that the tracking can be conducted in a highly accurate manner.

EXAMPLE 5

Figure 14:
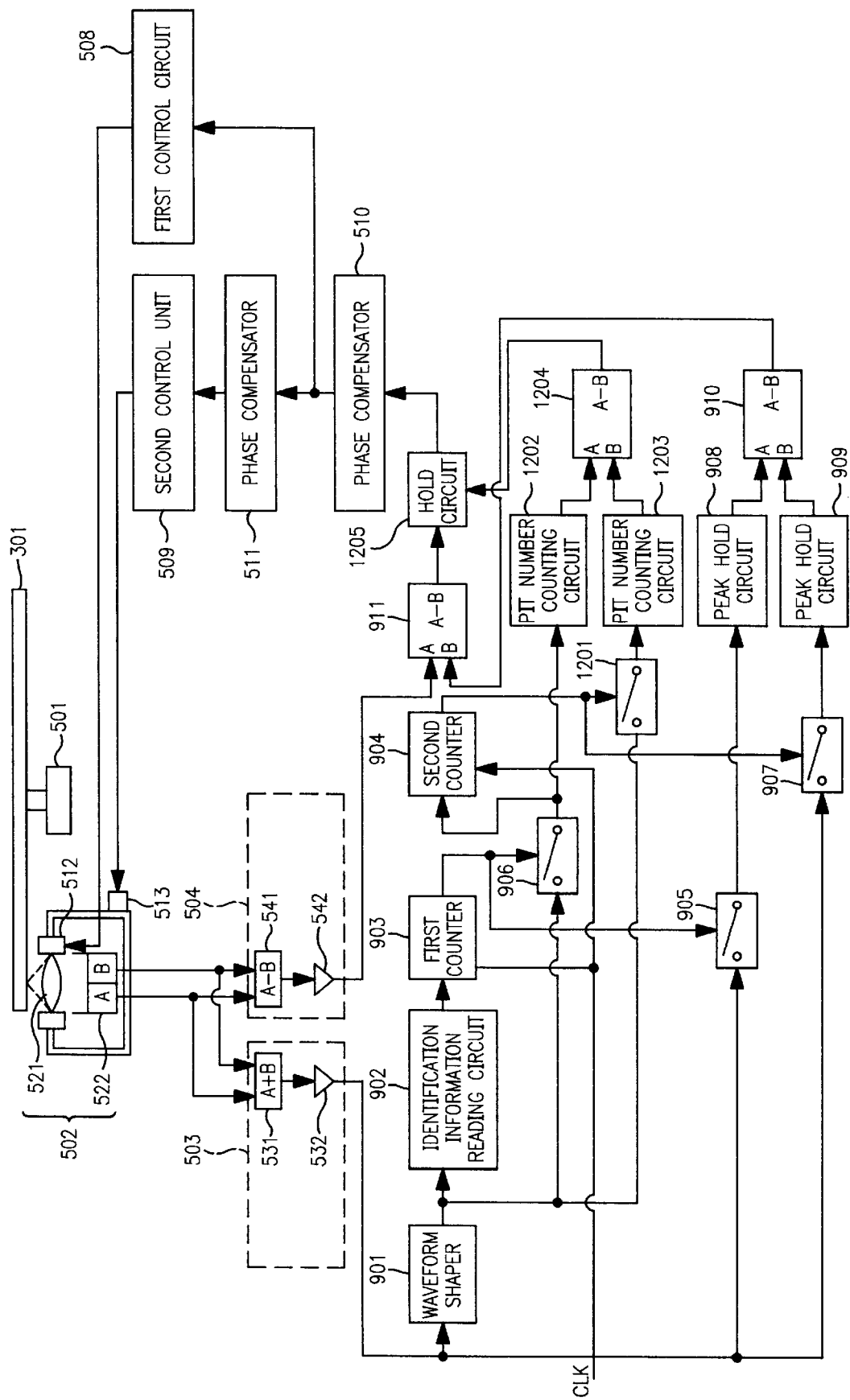
FIG. 14 is a diagram of an optical disk apparatus according to Example 5 of the invention.

An optical disk apparatus according to Example 5 of the invention will be described. FIG. 14 shows the configuration of an optical disk apparatus of Example 5. In order to simplify the description, the description will be made on the basis of the optical disk apparatus of Example 4 shown in FIG. 10. In FIG. 14, components which are similar in configuration to those described in the optical disk apparatus of Example 4 shown in FIGS. 11 and 12 are indicated by the same numerals, and the description of these components is omitted.

As shown in FIG. 14, the optical disk apparatus includes a gate circuit 1201, pit number counting circuits 1202 and 1203, a pit detection error judging circuit 1204, and a hold circuit 1205, in addition to the components of the optical disk apparatus of Example 4. The gate circuit 1201 gates the binarized reproduction signal output from the waveform shaper 901 during the count period of the second counter 904. The pit number counting circuit 1202 detects the pit number from the binarized reproduction signal which is gated by the gate circuit 906. The pit number counting circuit 1203 detects the pit number from the binarized reproduction signal which is gated by the gate circuit 1201. The pit detection error judging circuit 1204 which judges whether an output of each of the pit number counting circuits 1202 and 1203 is 1 or not. When the judgment result of the pit detection error judging circuit 1204 shows correctness, the hold circuit 1205 holds an output of the subtraction circuit 911.

Figure 15:
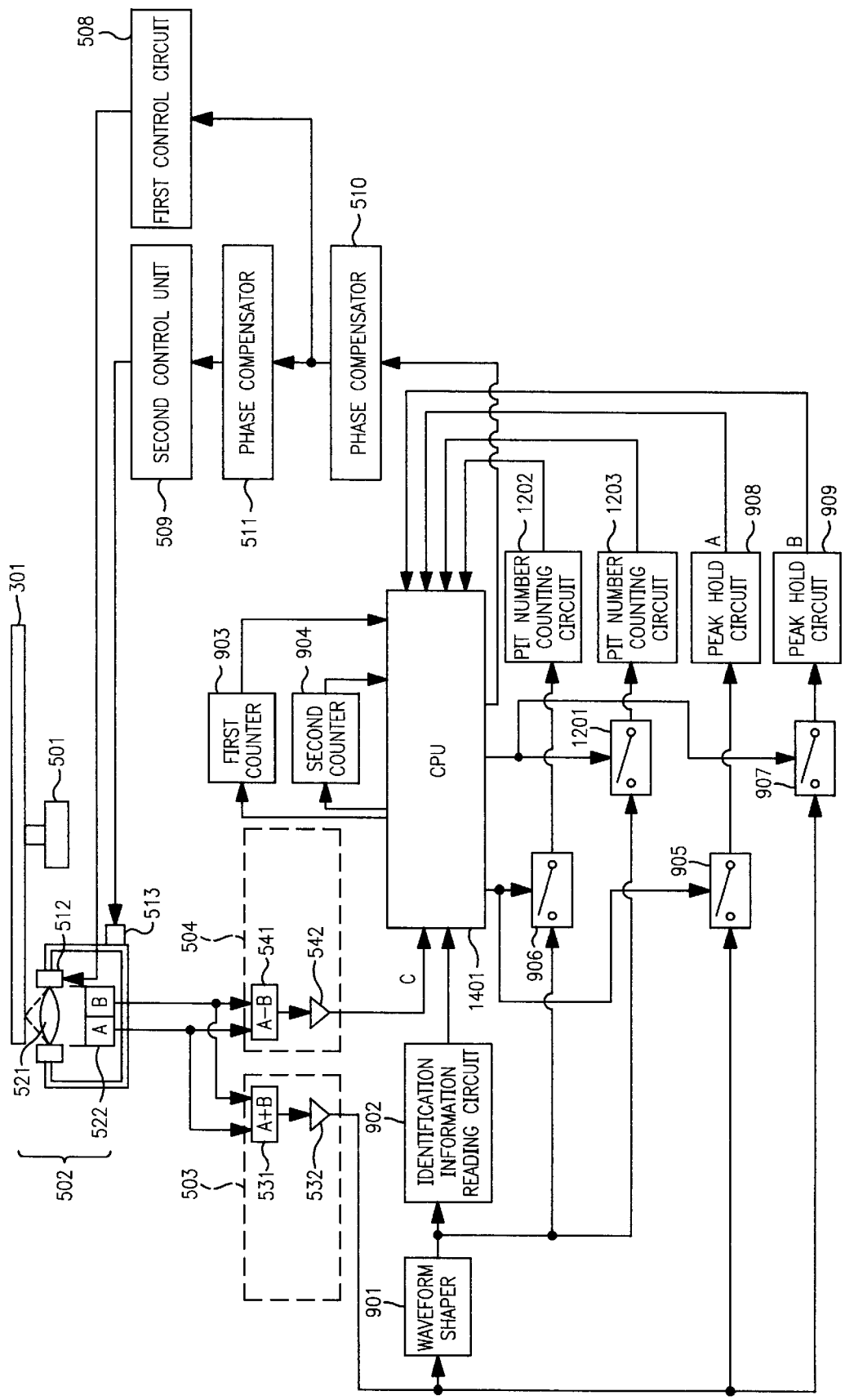
FIG. 15 is a diagram showing a modification of Example 5 according to the invention.

The optical disk apparatus of Example 5 may be constructed using a computer such as a CPU. FIG. 15 shows an example using a computer. In the optical disk apparatus shown in FIG. 15, the functions of the subtraction circuits 910 and 911, the pit detection error judging circuit 1204, and the hold circuit 1205 shown in FIG. 14 are conducted by a CPU 1401.

Figure 16:
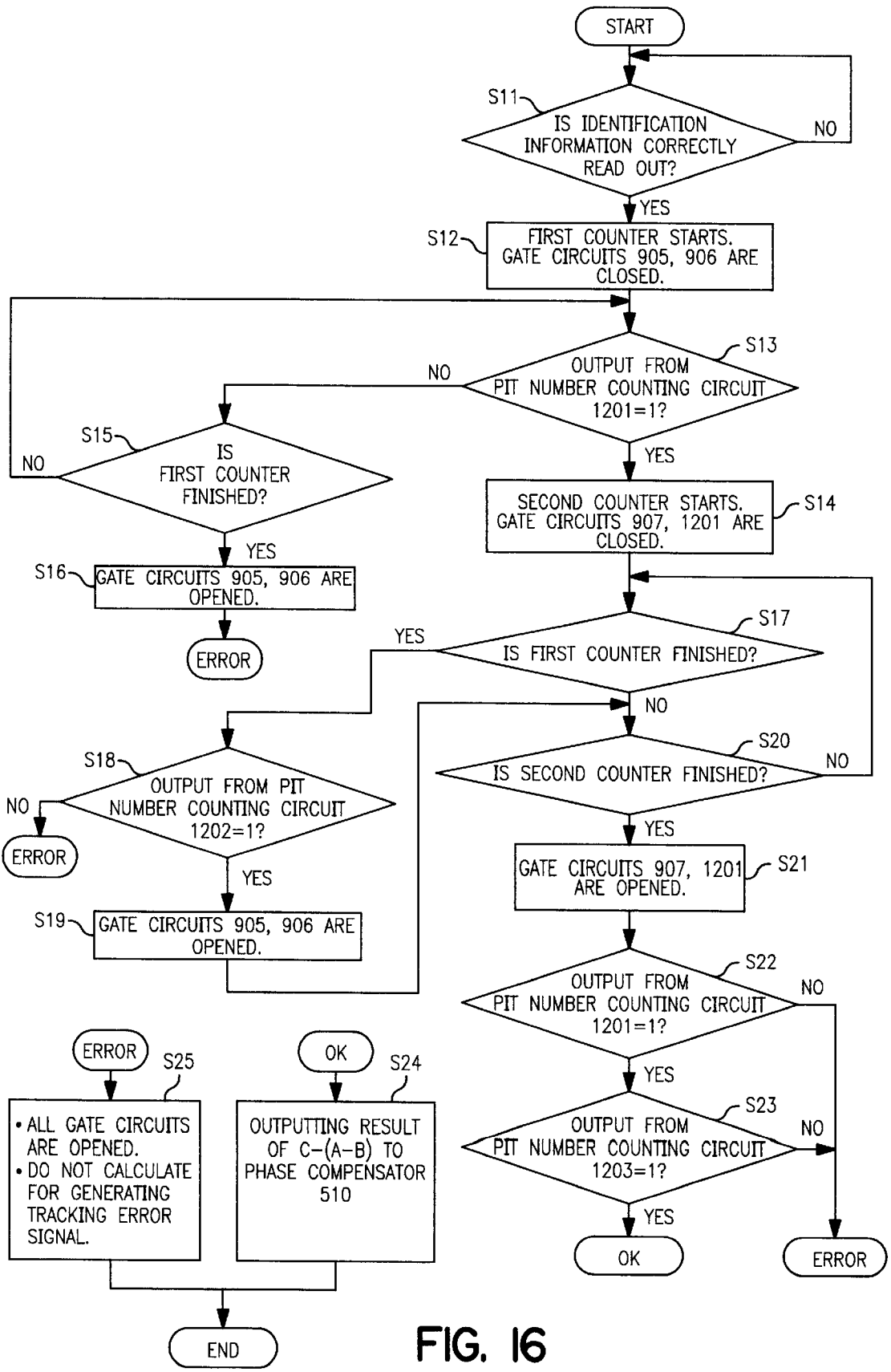
FIG. 16 is a flow chart showing a tracking method of Example 5 according to the invention.

The operations of the optical disk apparatus of Example 5 will be described. FIG. 16 shows a flow chart of the operations of the optical disk apparatus. Most of the operations of the optical disk apparatus of Example 5 are similar to those of the optical disk apparatus of Example 4. Therefore, FIG. 13 is also referred to.

The operation of Step S11 in FIG. 16, that is, the operation until the identification information error detector 1004 outputs the OK signal (i) when the identification information is correctly read out, is the same as that in the optical disk apparatus of Example 4 shown in FIG. 13. Therefore, description of signals (a), (b), and (f)–(h) is omitted.

At Step S12, with respect to the OK signal (i), the first counter 903 starts a count operation on the basis of the clock signal (CLK) of a fixed frequency, not shown in FIG. 13, and the gate circuits 905 and 906 are closed, i.e., the gates are opened. The CPU 1401 continues to output the gate signal (j) to the gate circuits 905 and 906 until a count of a predetermined number is completed by the first counter 903. The pit number counting circuit 1202 counts the pit number from the binarized reproduction signal (e) which is input during the period of the gate signal (j), and outputs the counted pit number to the CPU 1401. The peak hold circuit 908 holds a peak level A of the reproduction signal input from the reproduction signal processing circuit 503 during the period of the gate signal (j).

At Step S13, when the output of the pit number counting circuit 1202 reaches "1", the CPU proceeds to Step S14. At Step S14, the second counter 904 starts a count operation on the basis of the clock signal (CLK) of a fixed frequency, not shown in FIG. 13, and the gate circuits 907 and 1201 are closed, i.e., the gates are opened. The CPU 1401 continues to output the gate signal (k) to the gate circuits 907 and 1201 until a count of a predetermined number is completed by the second counter 904. The pit number counting circuit 1203 counts the pit number from the binarized reproduction signal (e) which is input during the period of the gate signal (k), and outputs the counted pit number to the CPU 1401. The peak hold circuit 909 holds a peak level B of the reproduction signal input from the reproduction signal processing circuit 503 during the period of the gate signal (k).

On the other hand, in the case where while the output of the pit number counting circuit 1202 does not reach "1" at Step S13, the first counter 903 finishes counting at Step S15, that is, the case where the wobble pit is not detected during the period of gate signal (j), at Step S16, the gate circuits 905 and 906 are opened and the CPU 1401 determines that the operation is "error".

In the case where after the output of the pit number counting circuit 1202 reaches "1", the first counter 903 finishes counting at Step S17, it is judged whether or not the output of the pit number counting circuit 1202 is "1" at Step S18. When the output is not "1", i.e., 2 or more, it is considered that there are pseudo pits due to defect in the servo region 306 of the optical disk 301, thus determining that the operation is "error". When the output is "1", the gate circuits 905 and 906 are opened at Step S19.

Then, the process goes to Step S20. When the second counter 904 finishes counting, the gate circuits 907 and 1201 are opened at Step S21. At Steps S22 and S23, it is judged whether or not the outputs of the pit number counting circuits 1202 and 1203 are "1", respectively. When both of the outputs are "1", it is considered that the wobble pits 306a and 306b are correctly detected, and the operation is determined as "OK". On the other hand, when the outputs are not "1", it is guessed that the servo region 306 of the optical disk 301 lacks the wobble pits or has pseudo pits due to defects, thus the operation is determined as "error".

In the case of the determination of "OK", at step S24, the CPU 1401 obtains a wobble tracking error signal by subtracting the peak level B held by the peak hold circuit 909 from the peak level A held by the peak hold circuit 908. Then, the CPU 1401 subtracts the difference (A–B) from a push-pull tracking error signal output from the tracking error detection circuit 504, thus obtaining a tracking signal in which the track offset included in the push-pull tracking error signal is eliminated. The corrected tracking error signal is output to the phase compensator 510.

On the other hand, in the case of the determination of "error", at Step S25, all of the gate circuits 905, 906, 907 and 1201 are opened. In such a case, an abnormality such as the formation of pseudo pits due to defects or a lack of the wobble pits 306a and 306b is raised in the servo region 306, there is a fear that the peak hold circuits 908 and 909 may fail to detect the peak levels of the reproduction signals of the normal wobble pits 306a and 306b. Therefore, the CPU 1401 outputs the push-pull tracking error signal C to the phase compensator 510 without conducting the above-described calculation for obtaining the corrected tracking error signal.

Although the configuration using a computer is exemplified here, the configuration shown in FIG. 14 can also operate as the same manner. In the case shown in FIG. 14, the pit detection error judging circuit 1204 is configured by a comparator, for example, and the operations are conducted so that, only when the outputs of both the pit number counting circuits 1202 and 1203 are "1", the hold circuit 1205 holds the output of the subtraction circuit 911. In the case where 1 the output values of the pit number counting circuits 1202 and 1203 are not "1", the hold circuit 1205 is inhibited from holding the new output of the subtraction circuit 911.

As described above, in addition to the highly accurate detection of wobble pits which has been described in Example 4, the optical disk apparatus according to Example 5 conducts the following operations: After the operation of reading the identification region 305 is completed and while the first counter 903 then conducts a count operation for the predetermined period, the gate circuit 906 gates the binarized reproduction signal of the first wobble pit 306a. After the first wobble pit 306a is detected and while the second counter 904 then conducts a count operation for the predetermined period, the gate circuit 1201 gates the reproduction signal of the second wobble pit 306b, and the pit number counting circuits 1202 and 1203 count the gated pits. When both the pit number counting circuits 1202 and 1203 count only one pit, the pit detection error judging circuit 1204 judges that the normal wobble pits 306a and 306b are detected, and the hold circuit 1205 holds the output of the subtraction circuit 911. The provision of the pit detection error judging circuit 1204 can also inhibit an optical disk which lacks wobble pits or has pseudo pits due to defects, from being subjected to the track offset correction based on an erroneous detection, whereby an erroneous operation can be prevented from occurring.

EXAMPLE 6

Figure 17:
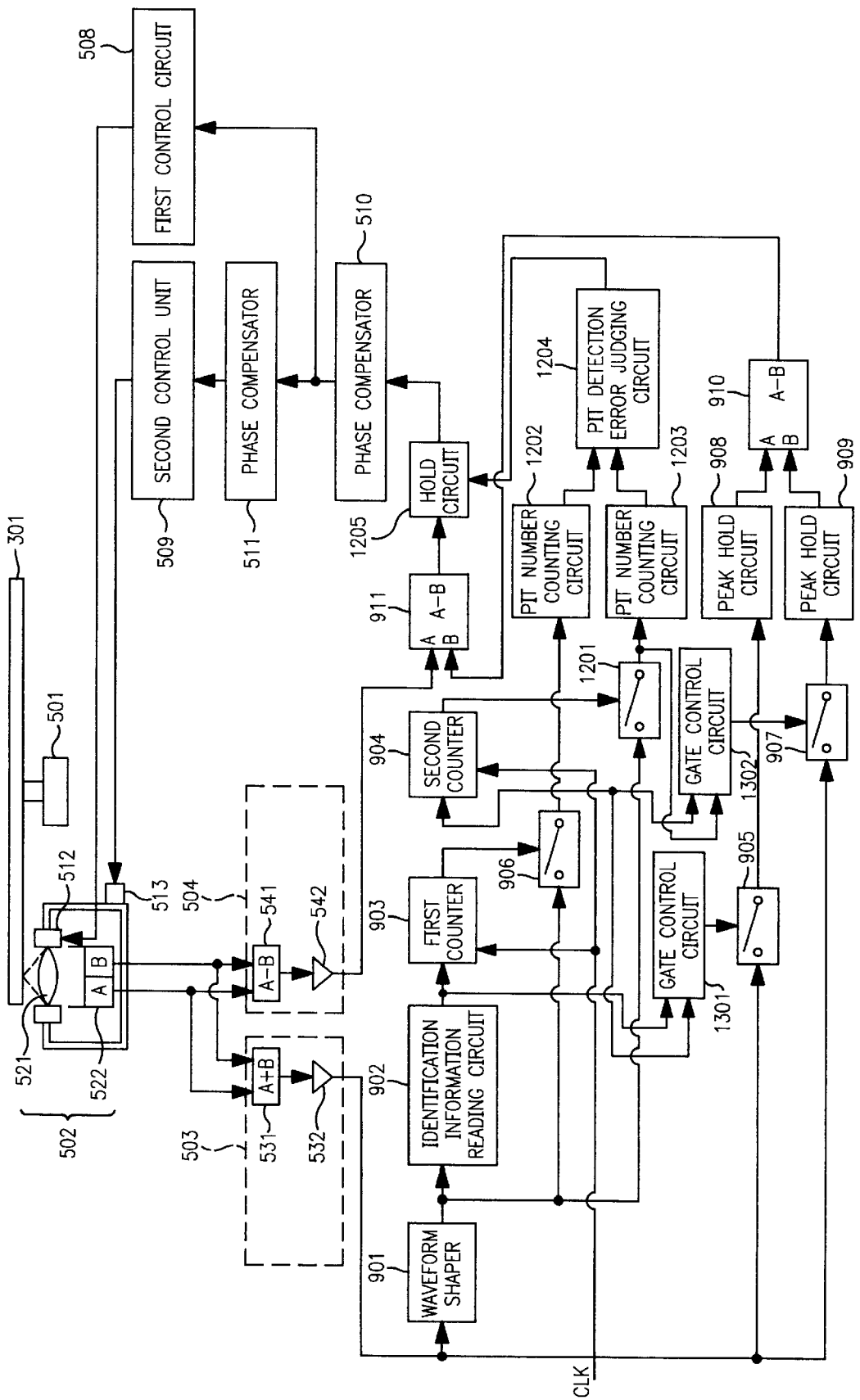
FIG. 17 is a diagram of an optical disk apparatus according to Example 6 of the invention.

An optical disk apparatus according to Example 6 of the invention will be described with reference to the diagram of FIG. 17. In FIG. 17, components which are similar in configuration to those described in the optical disk apparatuses of Examples 4 and 5 shown in FIGS. 11, 12 and 14 are indicated by the same numerals, and the description of these components is omitted.

The optical disk apparatus includes gate control circuits 1301 and 1302, in addition to the components of the optical disk apparatus of Example 5. The gate control circuit 1301 controls the gate circuit 905 so as to open the gate during a period from the start of the count operation of the first counter 903 to the detection of the first pit of the binarized reproduction signal which is gated by the gate circuit 906. The gate control circuit 1302 controls the gate circuit 907 so as to open the gate during a period from the start of the count operation of the second counter 904 to the detection of the first pit of the binarized reproduction signal which is gated by the gate circuit 1201.

Figure 18:
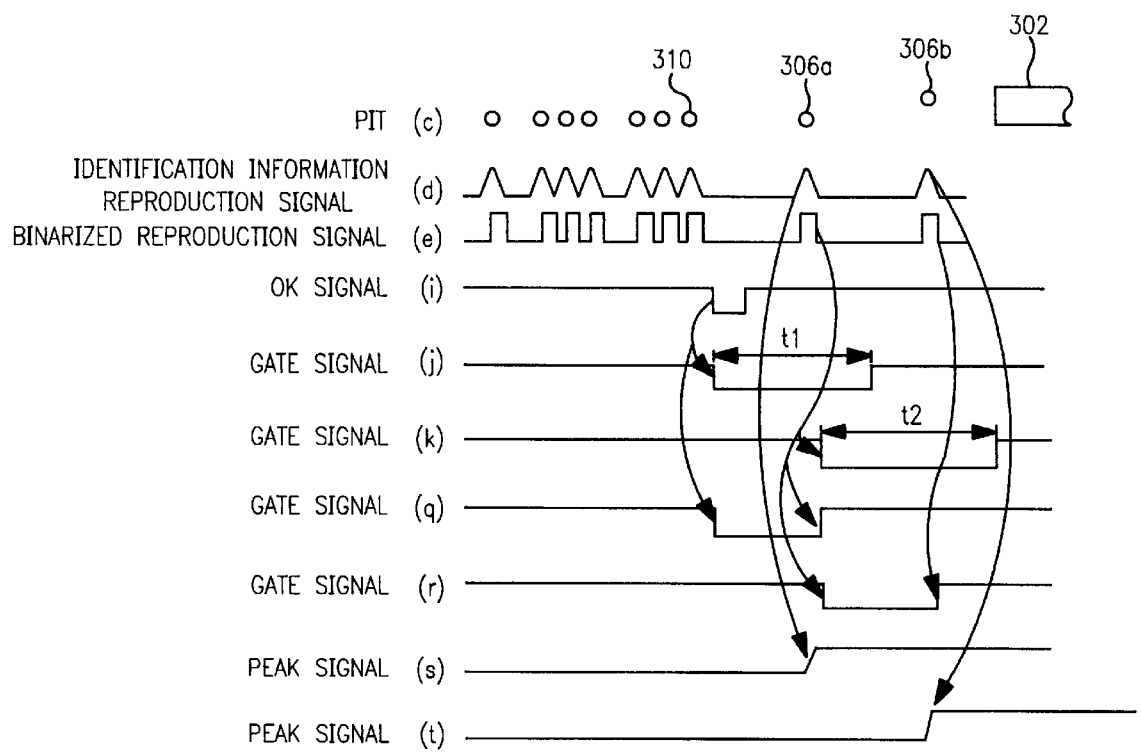
FIG. 18 is a chart showing operations of various portions of an optical disk apparatus according to Example 6 of the invention in the case where an optical disk 301 is constantly rotated by a motor 501.

Next, the operations of the optical disk apparatus of Example 6 will be described in detail with reference to the basic flow chart shown in FIG. 9. FIG. 18 is a chart showing operations of various portions of the optical disk apparatus of Example 6, particularly in the case where the optical disk 301 is constantly rotated by the motor 501.

First, at Step S1 in FIG. 9, the identification information is read out. When the identification information is correctly read out, at Step S2, the identification information error detector 1004 outputs the OK signal (i). The optical disk apparatus operates in the same manner as the optical disk apparatus of Example 5, at Steps S1 and S2, as described above. Therefore, signals (a), (b), and (f)–(h) are not shown in FIG. 18 and their description is omitted.

Next, at Step S3, a wobble tracking error signal is generated based on the OK signal (i). The operation of Example 6 will be described below.

Although not shown, using the above-mentioned OK signal (i) as the reference, the first counter 903 starts a count operation on the basis of the clock signal (CLK) of the fixed frequency, and the gate signal (j) which continues until a count of a predetermined number is completed is supplied to the gate circuit 906, and the binarized reproduction signal (e) is gated. The pit number counting circuit 1202 counts the pulses of the binarized reproduction signal (e) during the gated period. At the time when a first pit is detected during a period of the gate signal (j), the second counter 904 starts a count operation on the basis of the clock signal (CLK) of the fixed frequency in the same manner as the first counter 903. During a period which continues until a count of a predetermined number is completed, the gate signal (k) is supplied to the gate circuit 1201 so that the binarized reproduction signal (e) is gated. The pit number counting circuit 1203 counts the pulses of the binarized reproduction signal (e) during the gated period.

Furthermore, with respect to the OK signal (i), the gate control circuit 1301 supplies the gate signal (q) to the gate circuit 905 until the first pit of the binarized reproduction signal (e) is detected during the period wherein the gate circuit 906 conducts the gating operation. The peak hold circuit 908 holds the peak level of the reproduction signal of the wobble pit 306a which is gated by the gate circuit 905. During a period from the time when the first pit of the binarized reproduction signal (e) is detected during the period wherein the gate circuit 906 conducts the gating operation, to that when the first pit of the binarized reproduction signal (e) is detected during the period wherein the gate circuit 1201 conducts the gating operation, the gate control circuit 1302 supplies a gate signal (r) to the gate circuit 907 so that the peak hold circuit 909 holds the peak level of the reproduction signal of the wobble pit 306b which is gated by the gate circuit 907. The subtraction circuit 910 obtains a difference between the peak level held by the peak hold circuit 908 and that by the peak hold circuit 909, thus generating the wobble tracking error signal.

The following operations at Step S4 and S5 are the same as those of the above-mentioned optical disk apparatus of Example 5.

As described above, in the optical disk apparatus according to Example 6 of the invention, during the period from the completion of the operation of reading the information identification region 305 to the detection of the first pit of the binarized reproduction signal (e) during the period wherein the gate circuit 906 conducts the gating operation, the gate circuit 905 gates the reproduction signal of the first wobble pit 306a, and, during the period from the detection of the first pit of the binarized reproduction signal (e) during the period wherein the gate circuit 906 conducts the gating operation to the detection of the first pit of the binarized reproduction signal (e) during the period wherein the gate circuit 1201 conducts the gating operation, the gate circuit 907 gates the reproduction signal of the second wobble pit 306b. The peak hold circuits 908 and 909 hold the peak levels of the gated reproduction signals of the pair of wobble pits 306a and 306b.

In the same manner as Example 5, therefore, the periods during which the wobble pits 306a and 306b are detected from the information identification region 305 and which are preset in the first and second counters 903 and 904 are shorter than the period required for the optical disk 301 to make one turn, because the wobble pits 306a and 306b are located behind the rear end portion of the information identification region 305. Consequently, influences of rotation unevenness due to fluctuation of the motor 501, eccentricity of the optical disk 301, or the like can be reduced to a very low level, resulting in that the wobble pits 306a and 306b can be detected in a highly accurate manner. Also since the detection of the wobble pit 306b is started at the time when the wobble pit 306a is detected, particularly, the detection of the wobble pit 306b has the same detection accuracy as that of the detection of the wobble pit 306a, with the result that the tracking can be conducted in a highly accurate manner.

The provision of the pit detection error judging circuit 1204 can also inhibit an optical disk which lacks wobble pits 306a and 306b or has pseudo pits due to defects, from being subjected to the track offset correction based on an erroneous detection, whereby an erroneous operation can be prevented from occurring.

In the above, Examples 4, 5 and 6 using the optical disk 301 have been described as examples. For example, an optical disk having a single zone may be used. The kind of an optical disk which is can be used in the optical disk apparatus of the invention is not restricted.

EXAMPLE 7

Figure 19:
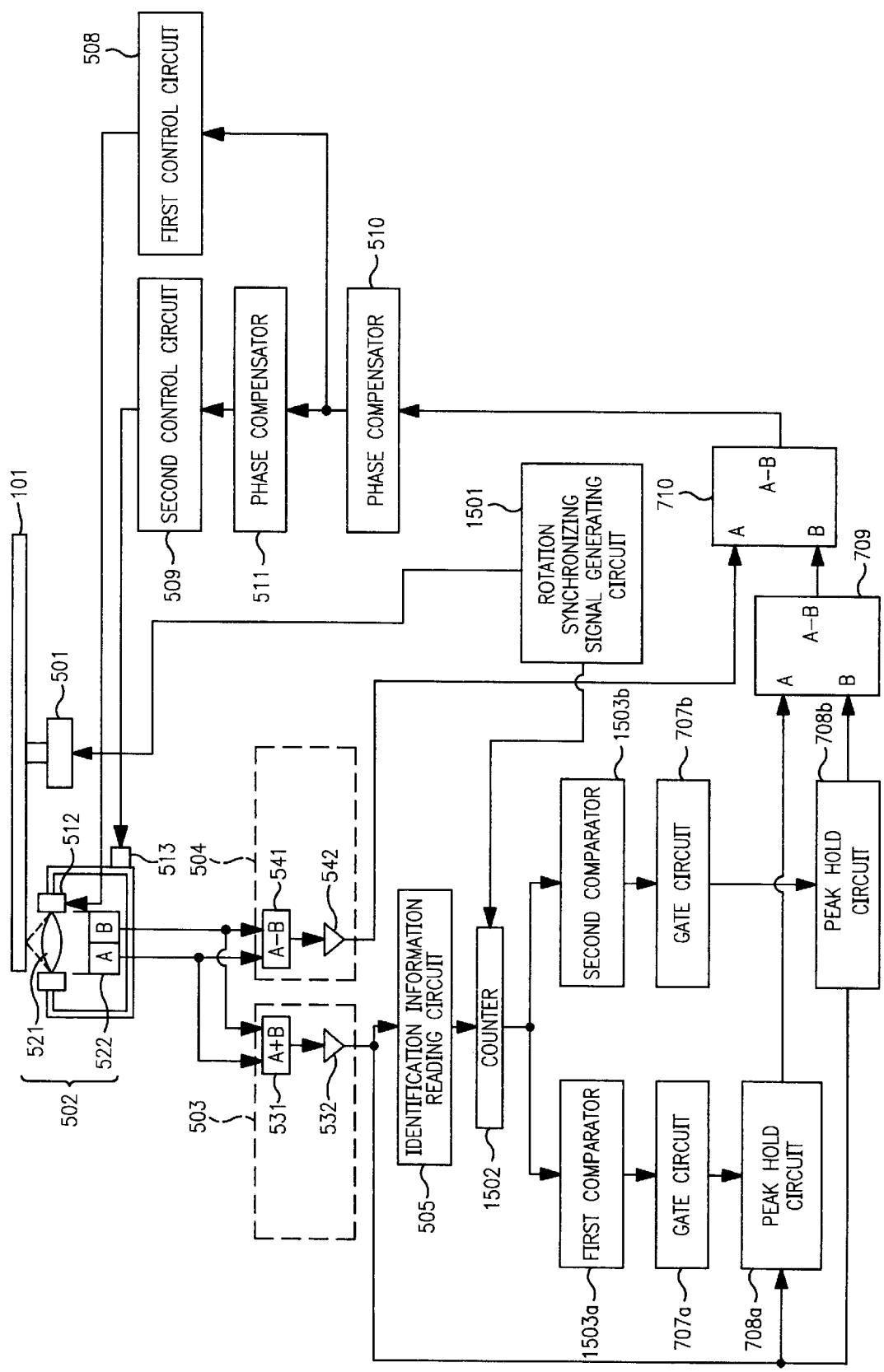
FIG. 19 is a diagram of an optical disk apparatus according to Example 7 of the invention.

An optical disk apparatus according to Example 7 of the invention will be described with reference to the diagram of FIG. 19. FIG. 19 shows the configuration of the optical disk apparatus of Example 7. The optical disk apparatus of FIG. 19 is an example in which information is recorded and reproduced by irradiating the optical disk 101 described with reference to FIG. 1 with light beams. In FIG. 19, components which are similar in configuration to those described in Example 3 shown in FIG. 6 are indicated by the same numerals, and the description of these components is omitted.

The optical disk apparatus includes a rotation synchronizing signal generating circuit 1501, a counter 1502, and first and second compensators 1503a and 1503b. The rotation synchronizing signal generating circuit 1501 supplies to the motor 501 a clock signal of a predetermined frequency and generates a synchronizing signal which is synchronized with the clock signal and which is a multiple of the clock signal. The counter 1502 counts the rotation synchronizing signal output from the rotation synchronizing signal generating circuit 1501. The first and second compensators 1503a and 1503b compare an output of the counter 1502 with predetermined values, respectively.

Next, the operations of the optical disk apparatus of Example 7 will be described in detail with reference to the basic flow chart shown in FIG. 9.

Figure 20:
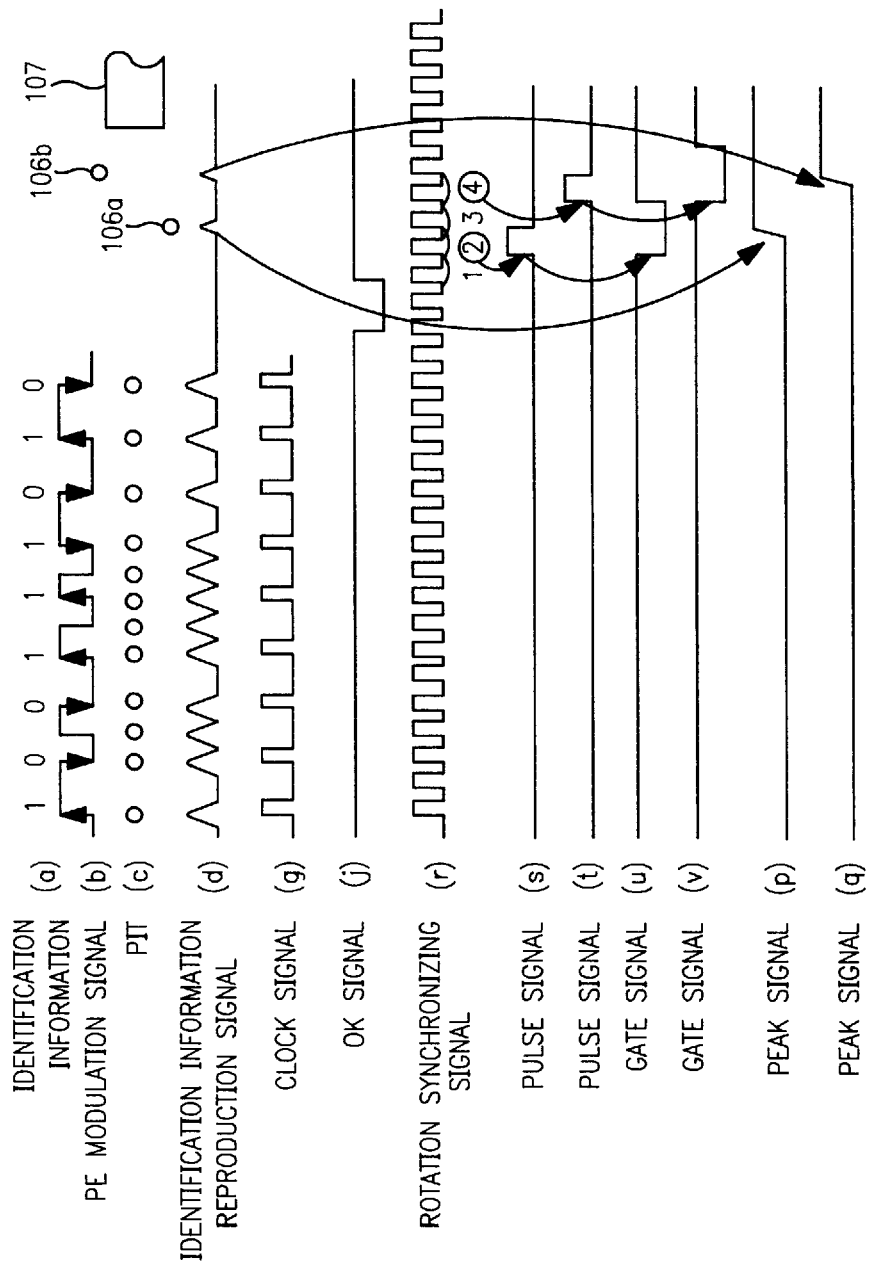
FIG. 20 is a chart showing operations of various portions of the optical disk apparatus according to Example 7 of the invention.

FIG. 20 is a chart showing operations of various portions of the optical disk apparatus according to Example 7.

First, at Step SI in FIG. 9, the identification information is read out. When the identification information is correctly read out, the identification information error detector 607 outputs the OK signal (j) at Step S2. At Steps S1 and S2, the optical disk apparatus operates in the same manner as Example 3. Therefore, signal (e), (f), (h) and (i) are not shown in FIG. 20.

Next, at Step S3, a wobble tracking error signal is generated based on the OK signal (j). The operation of Example 7 will be described below.

With respect to the above-mentioned OK signal (j), the counter 1502 counts the rotation synchronizing signal (r) output from the rotation synchronizing signal generating circuit 1501. The first and second compensators 1503a and 1503b compare the count value with the predetermined values. When the comparison results coincide with each other, pulse signals (s) and (t) are output to the gate circuits 707a and 707b which in turn generate gate signals (u) and (v) for respectively holding the peak levels of the reproduction signals of the pair of wobble pits 106a and 106b. The following operations are the same as those of the above-mentioned Example 3, thus generating the wobble tracking error signal.

The operations at Steps S4 and S5 are also the same as those of Example 3.

In Example 7, with respect to the predetermined clock numbers which are to be used in the comparison operations of the first and second compensators 1503a and 1503b, 2 is previously set as a comparison constant in the first compensator 1503a, and 4 in the second compensator 1503b. As shown in FIG. 20, the pulse signal (s) of the first compensator 1503a is output when the rotation synchronizing signal (r) corresponding to two clock pulses are counted with respect to the above-mentioned OK signal (j), and the signal (t) of the second compensator 1503b is output when the rotation synchronizing signal (r) corresponding to four clock pulses are counted with respect to the above-mentioned OK signal (j).

The optical disk is rotated in synchronization with the rotation synchronizing signal (r) which is output to the motor 501 from the rotation synchronizing signal generating circuit 1501. Therefore, the clock signal (g) reproduced via the optical head 502 is synchronized with the rotation synchronizing signal (r), and the rotation synchronizing signal has a frequency which is about two times that of the clock signal (g). The gate signals (u) and (v) are set so as to have a width corresponding to two periods of the rotation synchronizing signal (r).

As described above, in Example 7, the periods during which the wobble pits 106a and 106b are detected from the information identification region 105 are very much shorter than the period required for the optical disk 101 to make one turn, because the wobble pits 106a and 106b are located behind the rear end portion of the information identification region 105. Furthermore, the provision of the rotation synchronizing signal generating circuit 1501, the counter 1502, and the first and second compensators 1503a and 1503b enables the wobble pits 106a and 106b to be detected in synchronization with the rotation synchronizing signal for the motor 501. Therefore, influences of rotation unevenness due to fluctuation of the motor 501, eccentricity of the optical disk 101, or the like can be reduced to a very low level. The wobble pits can accurately be detected irrespective of the rotation number of the optical disk 101. Even in the case where the recording/reproduction process is conducted by the MCLV method or the like, particularly, a single value can be set in the first and second compensators 1503a and 1503b. As a result, the tracking can be conducted in a highly accurate manner without increasing the configuration size.

EXAMPLE 8

Figure 21:
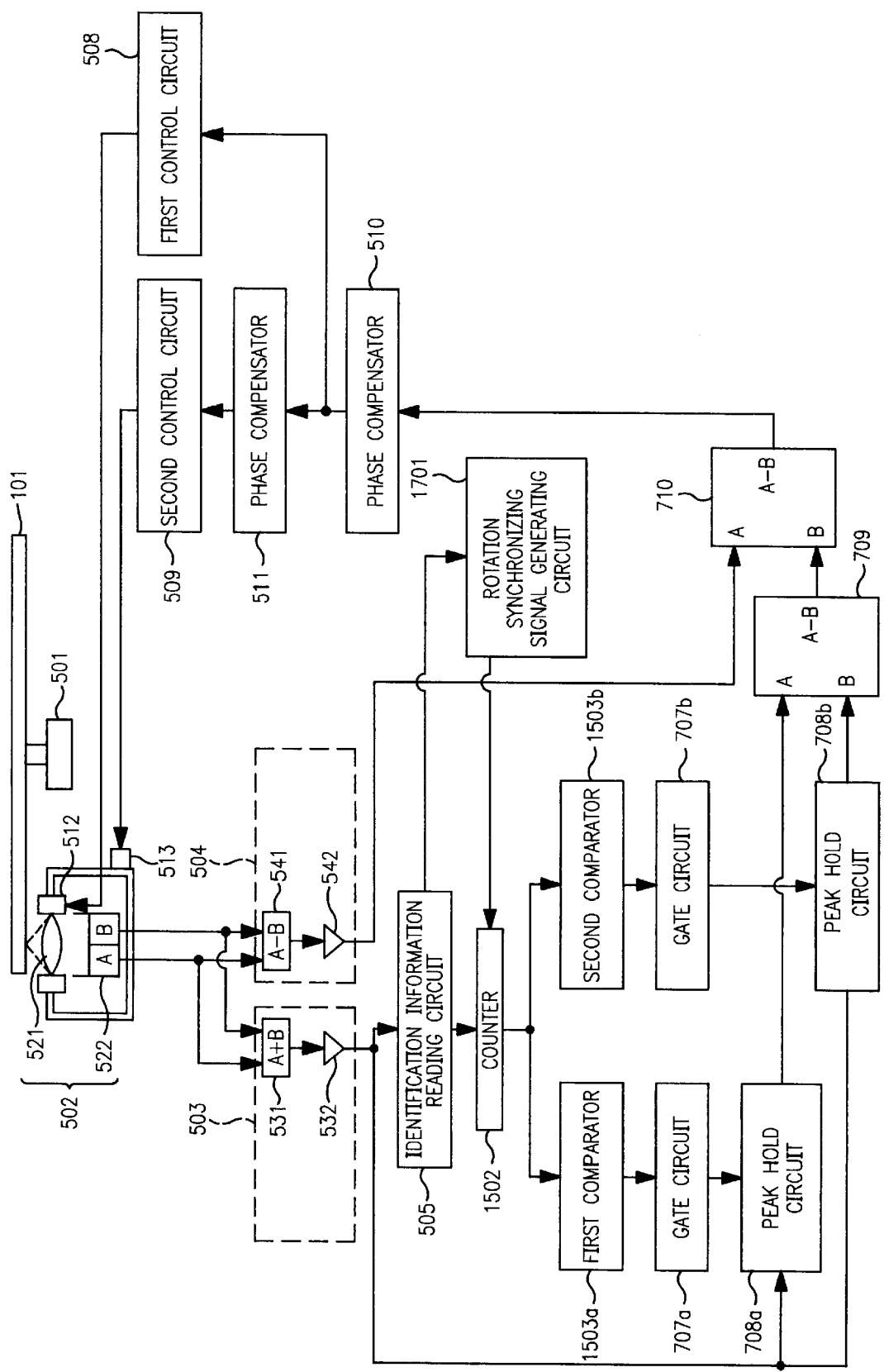
FIG. 21 is a diagram of an optical disk apparatus according to Example 8 of the invention.

An optical disk apparatus according to Example 8 of the invention will be described with reference to FIG. 21 which is a diagram of the optical disk apparatus of Example 8. In the optical disk apparatus of Example 8 information is recorded and reproduced by irradiating the optical disk 101 described with reference to FIG. 1 with light beams. In FIG. 21, components which are similar in configuration to those described in Examples 3 and 7 shown in FIGS. 6 and 19 are indicated by the same numerals, and the description of these components is omitted.

The optical disk apparatus includes, in addition to the components of that of Example 7, a synchronizing signal generating circuit 1701 which generates a synchronizing signal which is synchronized with the clock signal used by the identification information reading circuit 505 to read out the identification information of the identification region 105. The output of this circuit 1701 is supplied to the counter 1502.

Figure 22:
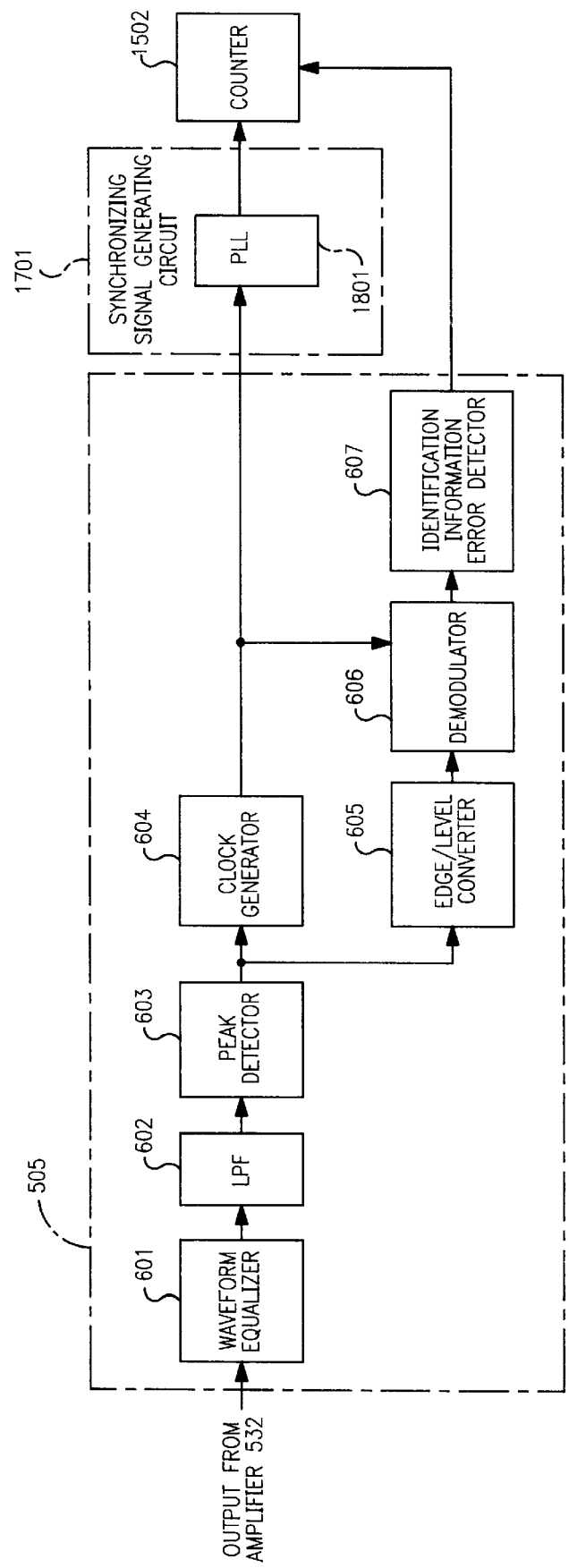
FIG. 22 is a diagram showing the connection between an identification information reading circuit 505 and a synchronizing signal generating circuit 1701 of the optical disk apparatus according to Example 8 of the invention.

The configuration of the identification information reading circuit 505 and the synchronizing signal generating circuit 1701 will be described. FIG. 22 shows a connection between the identification information reading circuit 505 and the synchronizing signal generating circuit 1701.

As shown in FIG. 22, the synchronizing signal generating circuit 1701 includes a phase locked loop (PLL) 1801. The PLL 1801 receives the clock signal generated by the clock generator 604 in the identification information reading circuit 505, and generates a clock signal of a multiple frequency synchronized with the received clock signal. The clock signal generated by the PLL 1801 is counted by the counter 1502, whereby a gate signal is generated at a predetermined timing.

Figure 23:
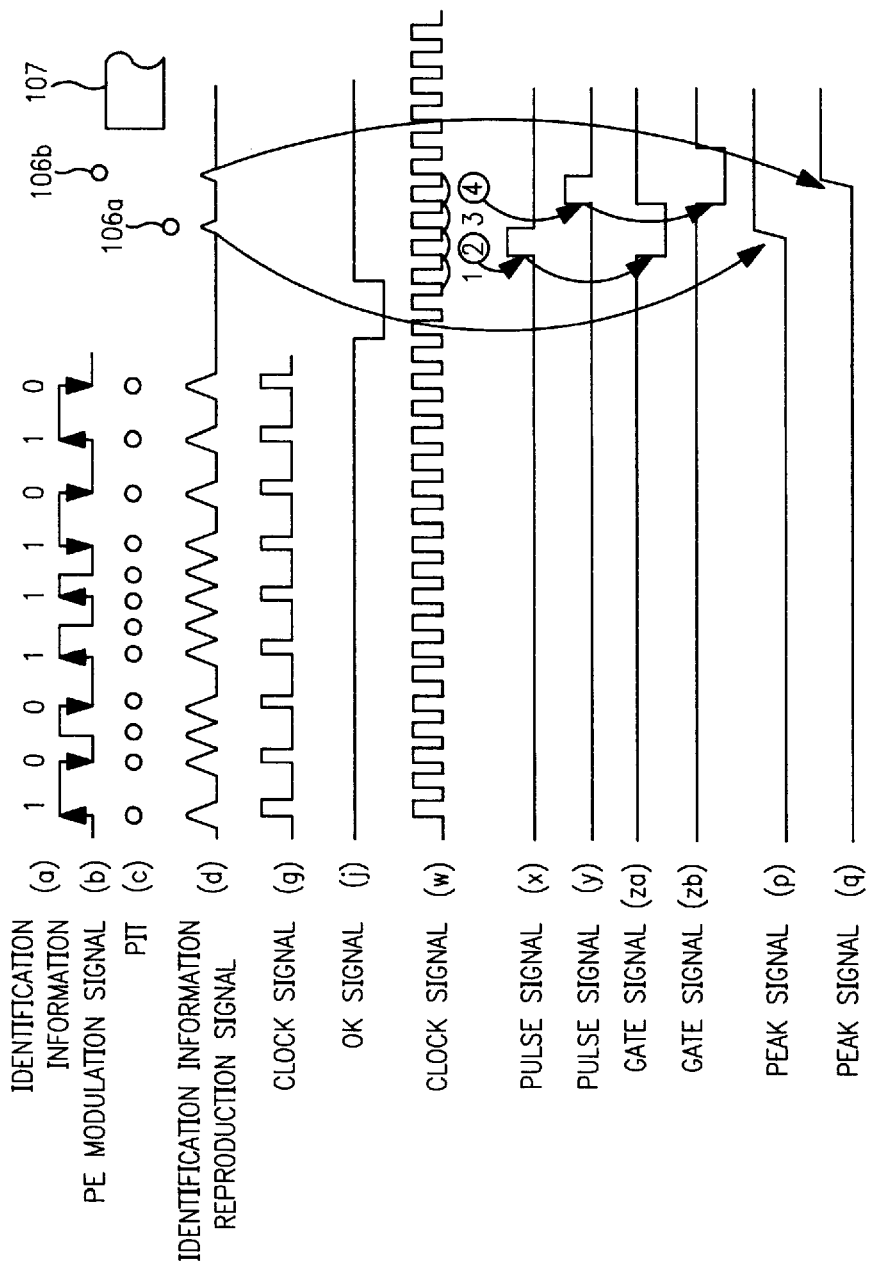
FIG. 23 is a chart showing operations of various portions of the optical disk apparatus according to Example 8 of the invention.

Next, the operations of the optical disk apparatus of Example 8 will be described in detail with reference to the basic flow chart shown in FIG. 9. FIG. 23 is a chart showing operations of various portions of the optical disk apparatus of Example 8.

First, at Step S1 in FIG. 9, the identification information is read out. When the identification information is correctly read out, the identification information error detector 607 outputs the OK signal (j). The optical disk apparatus of Step S1 and S2 of Example 8 operates in the same manner as Example 3. Therefore, signals (e), (f), (h) and (i) are not shown in FIG. 23.

Next, at Step S3, a wobble tracking error signal is generated based on the OK signal (j). The operation of Example 8 will be described below.

In FIG. 23, with respect to the above-mentioned OK signal (j), the counter 1502 counts the clock signal (w) which is synchronized with the clock signal for reading the identification information and generated by the clock generator 604 and which is multiplied by the PLL 1801. The first and second compensators 1503a and 1503b compare the count value with the predetermined values. When the comparison results coincide with each other, pulse signals (x) and (y) are output to the gate circuits 707a and 707b which in turn generates gate signals (za) and (zb) for respectively holding the peak levels of the reproduction signals (d) of the pair of wobble pits 106a and 106b. The following operations of holding the peak levels of the reproduction signals (d) of the pair of wobble pits 106a and 106b are the same as those of the above-mentioned Example 7, thus generating the wobble tracking error signal.

The operations at Steps S4 and S5 are also the same as those of Example 7.

As described above, in Example 8, the periods during which the wobble pits 106a and 106b are detected from the information identification region 105 are very much shorter than the period required for the optical disk 101 to make one turn, because the wobble pits 106a and 106b are located behind the rear end portion of the information identification region 105. Furthermore, the provision of the rotation synchronizing signal generating circuit 1701, the counter 1502, and the first and second compensators 1503a and 1503b enables the synchronizing signal to be extracted from a signal of the identification information on the optical disk 101. Therefore, influences of rotation unevenness due to fluctuation of the motor 501, eccentricity of the optical disk 101, or the like can be reduced to a very low level. The wobble pits can accurately be detected irrespective of the rotation number of the optical disk 101. Even in the case where the recording/reproduction process is conducted by the MCAV method or the like, particularly, a single value can be set in the first and second compensators 1503a and 1503b. As a result, the tracking can be conducted in a highly accurate manner without increasing the configuration size.

EXAMPLE 9

Figure 24:
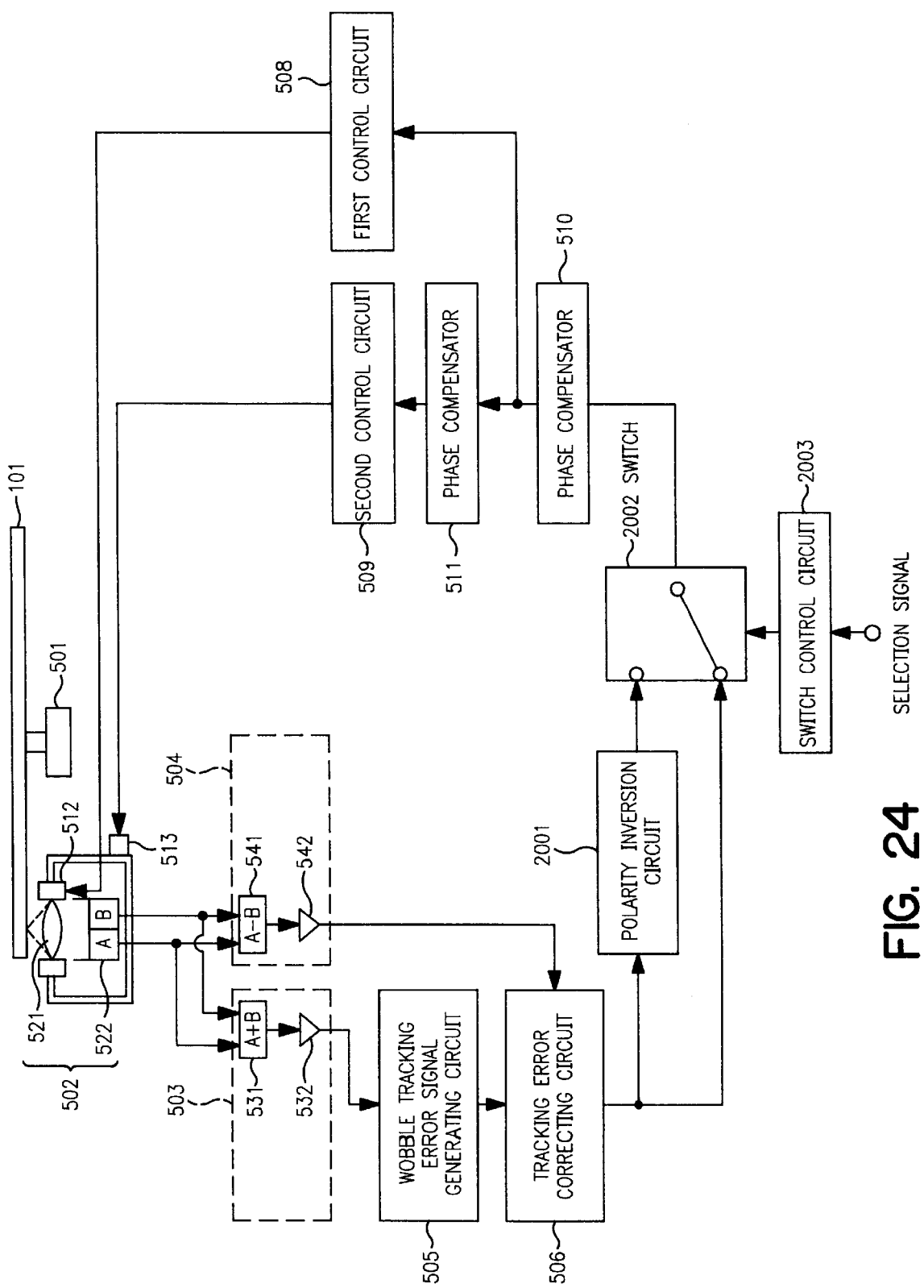
FIG. 24 is a diagram of an optical disk apparatus according to Example 9 of the invention.

An optical disk apparatus according to Example 9 of the invention will be described with reference to FIG. 24 which is a diagram of the optical disk apparatus of Example 9. In FIG. 24, components which are identical with those described in Example 3 shown in FIG. 6 are indicated by the same numerals, and the description of these components is omitted.

The optical disk apparatus includes a polarity circuit 2001, a switch 2002, and 1 switch control circuit 2003, in addition to the components of that of Example 3. The polarity inversion circuit 2001 inverts the polarity of tracking control. The switch 2002 selectively outputs either of an output signal of the polarity inversion circuit 2001 and that of the tracking error correcting circuit 506. The switch control circuit 2003 controls the switch 2002.

An output signal of the reproduction signal processing circuit 503 is supplied to the wobble tracking error signal generating circuit 505 which detects track deviation from the wobble pits 106a and 106b. As described in Example 3, the wobble tracking error signal generating circuit 505 detects peaks of reproduction signals of the wobble pits 106a and 106b on the basis of identification information, and generates a signal corresponding to the difference between the levels of the two signals.

The tracking error correcting circuit 506 calculates the difference between the output signal of the tracking error detection circuit 504 and that of thewobble tracking error signal generating circuit 505. An output signal of the circuit 506 is supplied to the polarity inversion circuit 2001 and also to a switch 2002. The output of the switch 2002 is supplied to the first control circuit 508 for controlling the operation of driving the actuator 512, via the phase compensator 510 for compensating the phase of the tracking control system. In accordance with the output, the first control circuit 508 controls the actuator 512 so that the spot of the light beam converged onto the optical disk 101 is always positioned on the center line of the track 102 or 103. The output of the switch 2002 is supplied also to the second control circuit 509 via the phase compensators 510 and 511. The second control circuit 509 controls the linear motor 513 in accordance with the output so that the converging lens 521 is moved by setting the liberated state as the center. The switch control circuit 2003 receives a selection signal indicative of the track in which the light beam spot is to be positioned, the groove track 102 or the land track 103. In accordance with the selection signal, the switch control circuit controls the switch 2002. For example, when the light beam spot is to be positioned in the groove track 102, the switch 2002 outputs the output signals of the tracking error correcting circuit 506, and, when the light beam spot is to be positioned in the land track 103, the switch 2002 outputs a polarity-inverted signal of the output of the tracking error correcting circuit 506, i.e., the output of the polarity inversion circuit 2001.

As described above, the polarity of the tracking error signal is inverted at each of the groove tracks 102 and the land tracks 103. This is inevitably equivalent to the case where the tracking correction direction is inverted at each of the land and groove tracks, and therefore the tracking control can be correctly conducted on both the groove tracks 102 and the land tracks 103.

As described above, in Example 9 of the invention, the provision of the polarity inversion circuit 2001, the switch 2002, and the switch control circuit 2003 can realize a higher recording density. Therefore, tracking can accurately be conducted on an optical disk in which information is recorded in and reproduced from both the groove tracks 102 and the land tracks 103.

In Examples described above, the rear end portion of the information identification region 105 is used as the reference, and each wobble pit is detected after an elapse of a predetermined period. The invention is not restricted to the Examples. For example, a specific mark such as a center mark may be disposed immediately before the servo region.

In the optical disk of Example 1 of the invention, and the optical disk apparatuses of Examples 7 and 8, T2 indicative of the interval between the wobble pits has a length corresponding to two periods of the reference clock signal (d). However, the length is not restricted to two periods. Moreover, the format of the identification region 105 and 305 is not limited to the above-described Examples. The invention can also be applied to the optical disk with a format using a track address instead of the sector address.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information apparatus in which at least one of recording and reproduction is conducted by irradiating a disk-like optical recording medium with a light beam, said optical recording medium comprising: land and groove tracks arranged in a spiral manner; data regions for recording and reproducing data, said data regions being disposed in at least one of said land and groove tracks and arranged intermittently in a track direction; an identification region disposed between said data regions, said identification region having an address defining a location of data on the disk-like optical recording medium; a completion information region disposed between said data regions and following said identification region, said completion information region having identification region completion information indicative of a rear end of said identification region; and a pair of wobble pits disposed behind said completion information region, said wobble pits being symmetrical about a center line of said track and separated from each other in the track direction, wherein said optical information apparatus comprises:

reproduction means for detecting one of a reflected light and a transmitted light from said optical recording medium, and for reproducing a recorded signal;

tracking error detection means for detecting positional deviation between a spot of said light beam and said land and groove tracks;

completion information read means for reading said identification region completion information from an output of said reproduction means, and for outputting an identification region completion signal;

wobble tracking error signal generation means for, using said identification region completion signal output from said completion information read means as a reference, detecting peak levels of reproduction signals respectively corresponding to said pair of wobble pits from an output signal of said reproduction means, and for obtaining a difference between said peak levels, thereby generating a wobble tracking error signal due to said pair of wobble pits; and tracking error correction means for obtaining a difference between an output level of said tracking error detection means and an output level of said wobble tracking error signal generation means, and for correcting an offset included in an output signal of said tracking error detection means in accordance with said output level difference;

wherein said wobble tracking error signal generation means comprises:

(a) first period signal generation means for, in response to said region completion signal output from said completion information read means, generating a first period signal indicative of a first period for one of said pair of wobble pits;

(b) timing signal generation means for, in accordance with said first period signal and said output signal of said reproduction means, generating a timing signal corresponding to a position of said one of said pair of wobble pits;

(c) second period signal generation means for, in response to said timing signal, generating a second period signal indicative of a second period for the other one of said pair of wobble pits; and (d) calculation means for, on the basis of said first and second period signals, detecting a peak level of said output signal of said reproduction means during said first period, and a peak level of said output signal of said reproduction means during said second period, for calculating a difference between the detected peak levels, and for outputting a calculation result to said tracking error correction means.

2. An optical information apparatus in which at least one of recording and reproduction is conducted by irradiating a disk-like optical recording medium with a light beam, said optical recording medium comprising: land and groove tracks arranged in a spiral manner; data regions for recording and reproducing data, said data regions being disposed in at least one of said land and groove tracks and arranged intermittently in a track direction; an identification region disposed between said data regions, said identification region having an address defining a location of data on the disk-like optical recording medium; a completion information region disposed between said data regions and following said identification region, said completion information region having identification region completion information indicative of a rear end of said identification region; and a pair of wobble pits disposed behind said completion information region, said wobble pits being symmetrical about a center line of said track and separated from each other in the track direction, wherein said optical information apparatus comprises:

reproduction means for detecting one of a reflected light and a transmitted light from said optical recording medium, and for reproducing a recorded signal;

tracking error detection means for detecting positional deviation between a spot of said light beam and said land and groove tracks;

completion information read means for reading said identification region completion information from an output of said reproduction means, and for outputting an identification region completion signal;

wobble tracking error signal generation means for, using said identification region completion signal output from said completion information read means as a reference, detecting peak levels of reproduction signals respectively corresponding to said pair of wobble pits from an output signal of said reproduction means, and for obtaining a difference between said peak levels, thereby generating a wobble tracking error signal due to said pair of wobble pits; and tracking error correction means for obtaining a difference between an output level of said tracking error detection means and an output level of said wobble tracking error signal generation means, and for correcting an offset included in an output signal of said tracking error detection means in accordance with said output level difference;

wherein said wobble tracking error signal generation means comprises:

(a) period signal generation means for, in response to said region completion signal output from said completion information read means, generating a period signal indicative of a period for said pair of wobble pits;

(b) peak detection means for, on the basis of said period signal output from said period signal generation means, detecting two peak levels corresponding to said pair of wobble pits from said output signal of said reproduction means;

(c) calculation means for calculating a difference between said two detected peak levels, and for outputting a calculation result to said tracking error correction means; and (d) pit counting means for counting the number of pits which appear in said output signal of said reproduction means during a period indicated by said period signal, and only when the pit number detected by said pit counting means is equal to a predetermined number, said tracking error correction means conducts the correction so that a spot of said light beam is positioned in said track, on the basis of an output signal of said calculation means and the output signal of said tracking error detection means.

3. An optical information apparatus according to claim 2, wherein said period signal generation means comprises a first period signal generation unit for generating a first period signal indicative of a first period, and a second period signal generation unit for generating a second period signal indicative of a second period, said pit counting means comprises a first pit counting unit for counting the number of pits which appear in said output signal of said reproduction means during said first period indicated by said first period signal, and a second pit counting unit for counting the number of pits which appear in said output signal of said reproduction means during said second period indicated by said second period signal, and only when the pit numbers counted by said first and second pit counting units are equal to 1, said tracking error correction means conducts the correction so that a spot of said light beam is positioned in said track, on the basis of the output signal of said calculation means and the output signal of said tracking error detection means.

4. An optical information apparatus according to claim 3, wherein said peak detection means comprises:

a first peak detection unit for detecting a peak level of said reproduction signal during a first period indicated by said first period signal; and a second peak detection unit for detecting a peak level of said reproduction signal during a second period indicated by said second period signal.

5. An optical information apparatus according to claim 3, wherein said wobble tracking error signal generation means further comprises:

first gate means for gating said reproduction signal during a period from a start of said first period indicated by said first period signal to a first pit detection conducted by said first pit detection unit; and second gate means for gating said reproduction signal during a period from a start of said second period indicated by said second period signal to a first pit detection conducted by said second pit detection unit, and said peak detection means comprises:

a first peak detection unit for detecting a peak level of an output signal of said first gate means; and a second peak detection unit for detecting a peak level of an output signal of said second gate means.

6. A tracking method used for an optical recording medium comprising: land and groove tracks arranged in a spiral manner; data regions for recording and reproducing data, said data regions being disposed in said land and groove tracks and arranged intermittently in a track direction; an identification region disposed between said data regions, said identification region having an address defining a location of data on the disk-like optical recording medium; a completion information region disposed between said data regions and following said identification region, said completion information region having identification region completion information indicative of a rear end of said identification region; and a pair of wobble pits disposed behind said completion information region, said wobble pits being symmetrical about a center line of said track and separated from each other in the track direction, wherein said tracking method for following said tracks with a light beam comprises the steps of:

generating a push-pull tracking error signal by detecting positional deviation between a spot of said light beam and said land and groove tracks;

reproducing a recorded signal by detecting one of a reflected light and a transmitted light from said optical recording medium;

generating an identification region completion signal by reading said identification region completion information from reproduced signal;

generating a wobble tracking error signal, using
said identification region completion signal as a reference, by detecting peak levels of said reproduced signal respectively corresponding to said pair of wobble pits and by obtaining a difference between said peak levels; and correcting said push-pull tracking error signal by obtaining a difference between a level of said push-pull tracking error signal and a level of said wobble tracking error signal, and by eliminating an offset included in said push-pull tracking error signal in accordance with said level difference;

wherein said step of generating said wobble tracking error signal comprises the steps of:
(a) generating a first period signal indicative of a first period for one of said pair of wobble pits, in response to said region completion signal;
(b) generating a timing signal corresponding to a position of said one of said pair of wobble pits, in accordance with said first period signal and said reproduced signal;
(c) generating a second period signal indicative of a second period for the other one of said pair of wobble pits, in response to said timing signal;
(d) detecting a peak level of said reproduced signal during said first period, and a peak level of said reproduced signal during said second period, on the basis of said first and second period signals; and
(e) calculating a difference between the detected peak levels.

7. A tracking method according to claim 6, wherein said step of generating said wobble tracking error signal further comprises the steps of:

first-gating said reproduced signal during a period from a start of said first period indicated by said first period signal to first pit detection; and second-gating said reproduced signal during a period from a start of said second period indicated by said second period signal to a first pit detection, and said step of detecting the peak level comprises the steps of:
detecting a peak level corresponding to said first-gating step; and
detecting a peak level corresponding to said second-gating step.

8. A tracking method used for an optical recording medium comprising: land and groove tracks arranged in a spiral manner; data regions for recording and reproducing data, said data regions being disposed in said land and groove tracks and arranged intermittently in a track direction; an identification region disposed between said data regions, said identification region having an address defining a location of data on the optical recording medium; a completion information region disposed between said data regions and following said identification region, said completion information region having identification region completion information indicative of a rear end of said identification region; and a pair of wobble pits disposed behind said completion information region, said wobble pits being symmetrical about a center line of said track and separated from each other in the track direction, wherein said tracking method for following said tracks with a light beam comprises the steps of:

generating a push-pull tracking error signal by detecting positional deviation between a spot of said light beam and said land and groove tracks;

reproducing a recorded signal by detecting one of a reflected light and a transmitted light from said optical recording medium;

generating an identification region completion signal by reading said identification region completion information from reproduced signal;

generating a wobble tracking error signal, using
said identification region completion signal as a reference, by detecting peak levels of said reproduced signal respectively corresponding to said pair of wobble pits and by obtaining a difference between said peak levels; and correcting said push-pull tracking error signal by obtaining a difference between a level of said push-pull tracking error signal and a level of said wobble tracking error signal, and by eliminating an offset included in said push-pull tracking error signal in accordance with said level difference;

wherein said step of generating said wobble tracking error signal comprises the steps of:
(a) generating a period signal indicative of a period for said pair of wobble pits, in response to said region completion signal;
(b) detecting two peak levels corresponding to said pair of wobble pits from said reproduced signal, on the basis of said period signal;
(c) calculating a difference between said two detected peak levels; and
(d) counting the number of pits which appear in said reproduced signal during the period indicated by said period signal, and
(e) only when the detected pit number is equal to a predetermined number, conducting said tracking error correcting step.

* * * * *

UNITED STATES PATENT AND TRADE MARK OFFICE
CERTIFICATE OF CORRECTION

PATENT NO.  : 5,878,007
DATED       : March 2, 1999
INVENTOR(S) : Matsumoto et al.

It is certified that error appears in the above-identified patent and that said Letters Patent is hereby corrected as shown below:

Column 33, line 10, delete "disk-like".

Signed and Sealed this

Third Day of August, 1999

*Attest:*

Q. TODD DICKINSON

*Attesting Officer*   Acting Commissioner of Patents and Trademarks